(12) United States Patent
Szafir et al.

(10) Patent No.: US 12,427,664 B2
(45) Date of Patent: *Sep. 30, 2025

(54) AUGMENTED REALITY COORDINATION OF HUMAN-ROBOT INTERACTION

(71) Applicant: The Regents of the University of Colorado, Denver, CO (US)

(72) Inventors: Daniel Szafir, Erie, CO (US); Michael E. Walker, Boulder, CO (US); Hooman Hedayati, Rasht (IR)

(73) Assignee: The Regents of the University of Colorado, Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/668,453

(22) Filed: May 20, 2024

(65) Prior Publication Data

US 2024/0424673 A1 Dec. 26, 2024

Related U.S. Application Data

(63) Continuation of application No. 16/978,480, filed as application No. PCT/US2019/020831 on Mar. 5, 2019, now Pat. No. 11,986,963.

(Continued)

(51) Int. Cl.
*B25J 13/06* (2006.01)
*B25J 9/16* (2006.01)
(Continued)

(52) U.S. Cl.
CPC ............ *B25J 9/1666* (2013.01); *B25J 13/06* (2013.01); *G06F 3/14* (2013.01); *G06T 11/00* (2013.01); *G06V 20/10* (2022.01); *G06T 2200/24* (2013.01)

(58) Field of Classification Search
CPC .......... B25J 13/00; B25J 13/06; B25J 9/1666; G06V 20/10; G05D 1/0038; G05D 1/0016;
(Continued)

(56) References Cited

U.S. PATENT DOCUMENTS 7,236,854 B2 * 6/2007 Pretlove ................. G05B 19/42
318/568.22
7,353,082 B2 * 4/2008 Pretlove ................. G05B 19/42
700/264

(Continued)

FOREIGN PATENT DOCUMENTS

JP 2014-503376 A 2/2014
JP 2017-534091 A 11/2017

OTHER PUBLICATIONS

Bischoff et al., Perspectives on augmented reality based human-robot interaction with industrial robots, 2004, IEEE, p. 3226-3231 (Year: 2004).*

(Continued)

*Primary Examiner* — McDieunel Marc

(57) ABSTRACT

Systems and methods for human-robot communication. More particularly, some embodiments use augmented reality to facilitate communication of robot intention and teleoperation in human-robot cooperative environments. Various embodiments of the present technology provide a middleware that integrates augmented reality (AR) with novel teleoperation interfaces to increase operation effectiveness, support the user in conducting concurrent work, and decrease stress. Various embodiments provide predictive graphical interfaces such that a teleoperator controls a virtual robot surrogate, rather than directly operating the robot itself, providing the user with foresight regarding where the physical robot will end up and how it will get there. In accordance with various embodiments a user may (Continued)

select between two AR interfaces using such a surrogate: one focused on real-time control and one inspired by waypoint delegation.

40 Claims, 12 Drawing Sheets

Related U.S. Application Data

(60) Provisional application No. 62/638,578, filed on Mar. 5, 2018.

(51) Int. Cl.
  *G06F 3/14*    (2006.01)
  *G06T 11/00*   (2006.01)
  *G06V 20/10*   (2022.01)

(58) Field of Classification Search
  CPC . G06F 3/013; G06F 3/012; G06F 3/14; G06F 3/011; G06T 11/00; G06T 2200/24; G05B 2219/39449
  See application file for complete search history.

(56) References Cited

U.S. PATENT DOCUMENTS

| | | | |
|---|---|---|---|
| 9,643,314 | B2 | 5/2017 | Guerin et al. |
| 10,588,711 | B2* | 3/2020 | DiCarlo .......... A61B 90/37 |
| 11,986,963 | B2* | 5/2024 | Szafir ............. G06V 20/10 |
| 2013/0211592 | A1 | 8/2013 | Kim |
| 2014/0014637 | A1 | 1/2014 | Hunt |
| 2014/0207286 | A1 | 7/2014 | Wang et al. |
| 2016/0257000 | A1 | 9/2016 | Guerin et al. |
| 2016/0311115 | A1 | 10/2016 | Hill et al. |
| 2023/0375334 | A1* | 11/2023 | Kang ............... G01B 11/25 |

OTHER PUBLICATIONS

Willett et al., Embedded Data Representations, 2016, IEEE, p. 461-470 (Year: 2016).*
Klinke et al., Distributed user tracking concepts for augmented reality applications, 2000, IEEE, p. 37-44 (Year: 2000).*
Sherstyuk et al., Virtual Roommates in multiple shared spaces, 2011, IEEE, p. 81-88 (Year: 2011).*
Yong et al., Robot Task Execution with Telepresence Using Virtual Reality Technology, 1989, Int., p. 1-8 (Year: 1989).*
Chang et al., Robot Task Execution with Telepresence Using Virtual Reality Technology, 1989, IEEE, p. 1-12 (Year: 1989).*
Haunuma et al., The Tele-operation of the Humanoid Robot -Workspace Extension of the Arm with Step Motion, 2005, Int. p. 1-8 (Year: 2005).*
Pittman et al., Exploring Head Tracked Head Mounted Displays for First Person Robot Teleoperation, 2014, Int., pg., 1-6 (Year: 2014).*
European Patent Application No. 19764482.6, Extended European Search Report, 11 pages, Jan. 4, 2022.
Hasunuma, Hitoshi et al., "Development Of Teleoperation Master System With A Kinesthetic Sensation Of Presence," ICAT '99, 7 pages, 1999.
Hedayati, Hooman et al., "Improving Collocated Robot Teleoperation With Augmented Reality," HRI '18, 10 pages, Mar. 5-8, 2018.
Hou, M. et al., "Teleoperation Characteristics And Human Response Factor In Relation To A Robotic Welding System," Proc. IROS 96, pp. 1195-1199, Nov. 8, 1996.
International Application No. PCT/US2019/020831, International Search Report & Written Opinion, 13 pages, Jul. 23, 2019.
Japanese Patent Application No. 2020-546485, Office Action, 11 pages, Dec. 7, 2021.
Sian, Neo Ee et al., "Whole Body Teleoperation Of A Humanoid Robot—Development Of A Simple Master Device Using Joysticks," Proceedings of the 2002 IEEE/RSJ International Conference on Intelligent Robots And Systems, pp. 2569-2574, Oct. 2002.
Theofilis, Konstantinos et al., "Panoramic View Reconstruction For Stereoscopic Teleoperation Of A Humanoid Robot," 2016 IEEE-RAS 16th International Conference on Humanoid Robots, pp. 242-248, Nov. 15-17, 2016.

* cited by examiner

AUGMENTED REALITY COORDINATION OF HUMAN-ROBOT INTERACTION

CROSS-REFERENCE TO RELATED APPLICATIONS

This application is a continuation of U.S. patent application Ser. No. 16/978,480 filed Sep. 4, 2020; which is a national stage of International Application No. PCT/US2019/020831 filed Mar. 5, 2019; which claims priority to U.S. Provisional Application No. 62/638,578 filed Mar. 5, 2018, which is incorporated herein by reference in its entirety for all purposes.

STATEMENT REGARDING FEDERALLY FUNDED RESEARCH

This invention was made with government support under grant number NNX16AR58G awarded by NASA. The government has certain rights in the invention.

TECHNICAL FIELD

Some embodiments relate to human-robot communication, and, more particularly, to novel techniques for using augmented reality to facilitate communication of robot intention and teleoperation in human-robot cooperative environments.

BACKGROUND

Increasingly, humans are performing tasks alongside robots. For example, aerial drones, rovers, robotic arms, and other robots are being used in manufacturing environments alongside factory personnel, in emergency situations alongside emergency personnel, and in many other collaborative environments. Effective and safe deployment of robots in these environments can depend on a number of factors. For non-autonomous and semi-autonomous robots, one such factor is effective robot teleoperation. For example, some situations may rely on a human operator being able to monitor the robot's position, the robot's sensor feedback, positions of environmental objects, environmental feedback, and other inputs, while concurrently being able to precisely and predictably control one or more robots. For autonomous robots, another such factor is effective communication of robot intent. For example, when robots are making dynamic decisions about where and how they intend to move, those motions can be unpredictable to humans in the robots' environment; such that intuitive communication of the robots' intent can drastically improve safety and collaborative effectiveness.

SUMMARY

Systems and methods are described for novel techniques for using augmented reality to facilitate communication of robot intention and teleoperation in human-robot cooperative environments. In some embodiments, a method for operating an augmented reality display is provided. The method can include receiving data collected by a robot being teleoperated by a user using an augmented reality display (e.g., wearing a head-mounted display). The data collected from the robot may include information about a local environment (e.g., temperature, noises, radiation levels, etc.) and/or one or more robot states or the robot. The augmented reality system can then localize a view of the augmented reality display to identify a user perspective of the environment currently within a line of sight of the user wearing the head-mounted display. The system can then link the user perspective of the environment currently within the line of sight of the user to the data collected by the robot. The augmented reality view in the augmented reality display can be updated, based on the data linked to the user perspective, to improve the user perspective with robot data.

In some embodiments, one or more commands can be received from the user instructing the robot to change the one or more robot states. The one or more commands can be analyzed to identify any hazard that would potentially damage the robot or violate a safety rule upon execution. If a hazard is detected, a set of one or more modified commands can be generated to avoid the hazard. The augmented reality view in the augmented reality display can be updated to show a result of executing the one or more modified commands by the robot. Then, the set of one or more modified commands can be transmitted to the robot to be executed.

Embodiments of the present invention also include computer-readable storage media containing sets of instructions to cause one or more processors to perform the methods, variations of the methods, and other operations described herein.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings.

Figure 1:
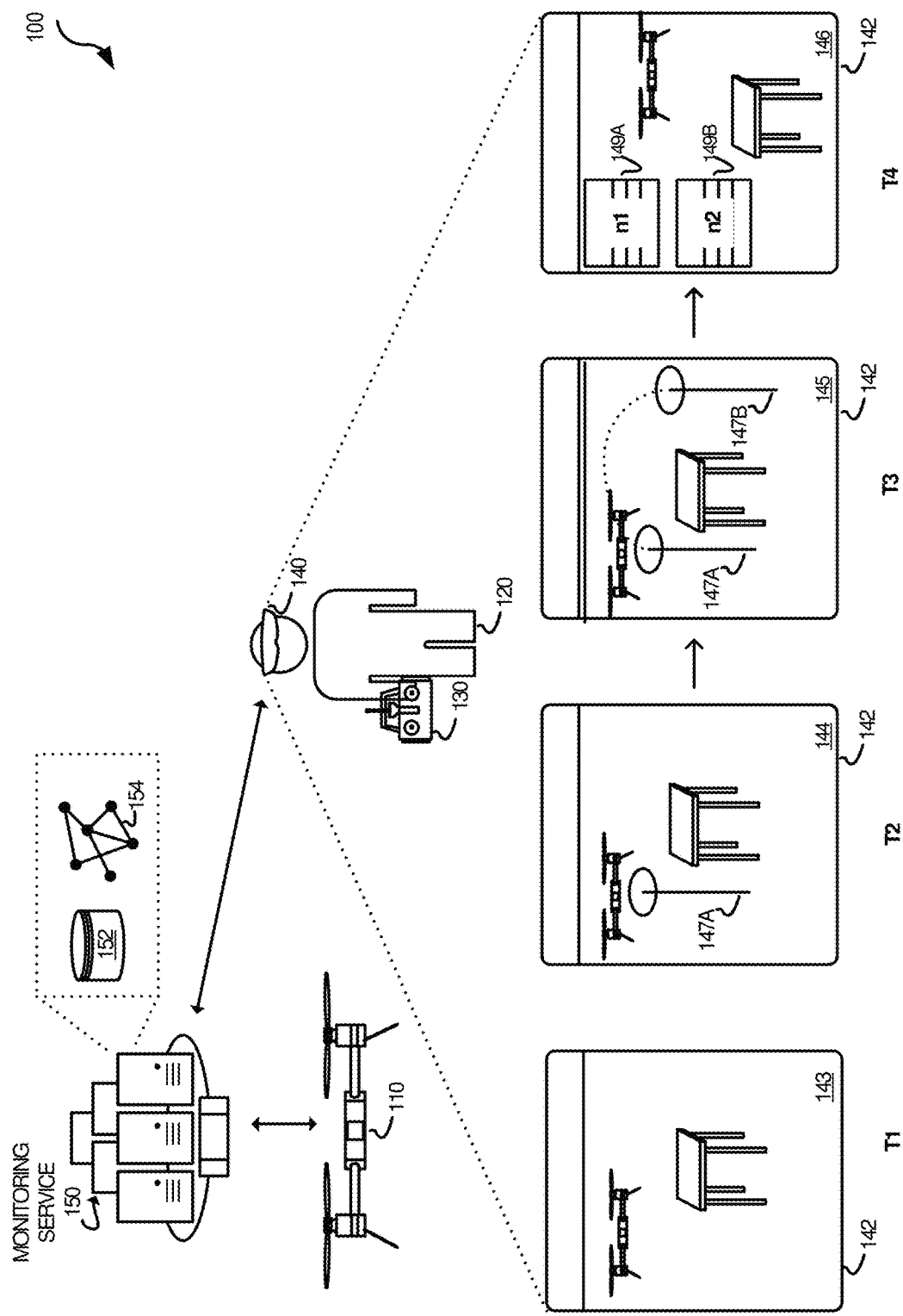
FIG. 1 illustrates an example of an environment in which some embodiments of the present technology may be utilized.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Increasing numbers of environments are arising that involve coordination between human and robot activity. In some of those environments, humans and robots are performing completely separate tasks in an overlapping space, such that coordination can help avoid collision, interference, injury, and/or other undesirable outcomes. For example, it can be desirable for pedestrians in a city or workers in a factory to avoid collision with autonomous vehicles and factory robots. In others of those environments, humans and robots are working together to accomplish particular tasks, such that coordination can help facilitate cooperation between the robot and human activities. For example, coordination can facilitate handing of tools or parts between the human and robot actors, notification between the human and robot actors of remaining and completed tasks, contribution of knowledge gained by one of the parties to the other(s), etc.

Embodiments described herein include novel techniques for using augmented reality (AR) to improve coordination between human and robot actors. Various implementations include novel approaches to virtually augmenting the robot actor(s), the environment in which the robot(s) are acting, and/or the user interface(s) for controlling the robot(s). For example, some implementations exploit recent advances in the development of consumer-grade, see-through augmented reality head-mounted displays (ARHMDs) to enable novel human-robot interactions. Generally, the approaches are categorized herein as "robot teleoperation" embodiments and "robot intent" embodiments. It will be appreciated that the categorization is only for the purpose of added clarity, and that techniques described with respect to robot teleoperation embodiments can be applied to embodiments of robot intent embodiments, and vice versa.

Before discussing particular embodiments, it is helpful to provide an overview of certain relevant technologies.

Robot Interface Technologies

While embodiments described herein apply to any suitable type of robot (e.g., aerial robots, rovers, robotic arms, etc.), the discussion focuses on aerial robot interfaces to provides a helpful illustrative context. Currently, most interfaces for aerial robots take one of two forms: direct teleoperation interfaces, where robots are controlled by a user via joysticks (or similar device) with a video display, or a higher-level supervisory interface that allows users to plot waypoints outlining desired robot path.

Teleoperation interfaces for aerial robots often require that users have a great deal of skill to be able to pilot a robot with potentially unfamiliar degrees of freedom while monitoring a live robot video feed. As an example of the skill required, the Federal Aviation Administration (FAA) in the United States initially considered regulations that would have required commercial aerial robot operators to obtain a pilot's license and still today requires that such robots be operated within line-of-sight range.

A great deal of research has sought to improve teleoperation paradigms. For example, certain interfaces provide the operator with a first-person view of the robot's video feed via display glasses. While this may help in certain tasks, it can also degrade overall situational awareness as the operator loses all contextual knowledge of the surrounding environment outside of the robot's immediate field of view. Other interfaces combine a live video display with virtual map data, often mixing teleoperation with forms of autonomous waypoint navigation. Still other approaches have looked to develop control systems using multi-modal interfaces including exotic designs where the user wears a head-mounted display (HMD) and the robot is controlled via a "floating head" metaphor, changing orientation in sync with the user. Finally, other research has advanced the notion of "perceived first-order control," which allows users to "nudge" an aerial robot using gestures on a mobile touchscreen, supporting more precise and safe operation.

One limitation of many existing systems is that they often focus on remote teleoperation, rather than collocated teleoperation, even though there are many deployments in which collocated control might be useful (e.g., monitoring construction sites, over-the-hill reconnaissance, factory logistics management, environmental surveys of mills, etc.) or even required due to line-of-sight regulations. In addition, current interfaces tend not to enable users to view information collected by the robot (e.g., live video feed) while monitoring the robot itself directly within the operating environment. Instead, traditional interfaces typically present a robot video feed and other sensor information on a display (e.g., mobile device), requiring that users choose between monitoring the robot or monitoring the robot's video feed, in a paradigm analogous to people who text while driving. Just as in texting while driving, monitoring a mobile device during teleoperation may distract users and degrade situational awareness, leading to poor piloting and even crashes. Some augmented reality approaches described herein enable a new model of teleoperation interfaces that mitigates this issue, enabling users to synthesize the knowledge and benefits of both first- and third-person views.

Augmented Reality Technologies

Augmented reality technology overlays computer graphics onto real world environments in real-time. AR interfaces have three main features: (1) users can view real and virtual objects in a combined scene, (2) users receive the impression that virtual objects are actually expressed and embedded directly in the real world, and (3) the virtual objects can be interacted with in real-time. This contrasts with purely virtual environments or other parts of the mixed reality continuum, such as augmented virtuality in which real-world objects are mixed into a virtual environment.

Early AR systems were often custom-made in research laboratories and were quite limited in display fidelity, rendering speed, support for interaction, and generalizability. However, recent advancements in augmented reality head-mounted display (ARHMD) technology is creating an ecosystem of standardized, consumer-grade see-through ARHMDs. For example, the HoloLens and Meta 2 ARHMDs both afford high resolution stereographic virtual imagery displayed at a 60 Hz refresh rate, built-in gesture tracking, depth sensing, and integration with standard development tools such as Unity and Unreal Engine. This advance in hardware accessibility is creating new opportunities for exploring AR as an interaction medium for enhancing human-robot interaction (HRI).

Various embodiments of the present technology described herein explore use of AR technologies as an enabling technology for novel types of robot teleoperation and robot intent communication. In particular, embodiments described herein augment human-robot interactions with virtual imagery using AR in three categorical ways, by: (1) augmenting the environment, (2) augmenting the robot, and/or (3) augmenting the user interface. Such categorization is intended only for added clarity, and not to limit the scope of any particular embodiment. Various examples are described with reference to ARHMDs, which enable certain features, such as stereographic information (e.g., including depth cues, etc.), a field of vision comparable to a human user's normal field of vision, hands free operation, and a very high level of immersion. Still, some or all of the embodiments described herein can similarly be implemented using any other suitable AR interfaces, such as a portable handheld tablet, or the like, operating as a "window on the world" AR interface.

Augmenting the environment: In this paradigm, interfaces can display information regarding robot operations and data collected by the robot as virtual imagery that is directly embedded into the context of the operational environment, using an environment-as-canvas metaphor. For example, objects that the user/robot has inspected (or plans to inspect) might be highlighted, or information might be added to better indicate the robot's field-of-view. This notion extends past work using mixed-reality projection systems in three major ways. First, ARHMDs afford a full three-dimensional "canvas" to utilize for virtual imagery, rather than a two-dimensional canvas from projector systems. Second, ARHMD environmental augmentations do not risk being occluded, such as when a user or robot interferes with projected light. Third, ARHMDs support stereographic environmental cues that can better leverage human depth perception, as opposed to monocular cues in traditional projector systems.

Augmenting the robot: In this archetype, virtual imagery may be attached directly to the robot platform in a robot-as-canvas metaphor. This technique may provide contextually relevant cues to an operator in a more fluid manner than traditional interfaces. For example, rather than displaying a battery indicator on a 2D display, requiring that the operator take their eyes off the robot to check status, virtual imagery might instead provide indication icons directly above the robot in physical space, enabling the operator to maintain awareness of both robot position and status. This technique may also alter robot form and/or function by creating new "virtually/physically embodied" cues, where cues that are traditionally generated using physical aspects of the robot are instead generated using indistinguishable virtual imagery.

For example, rather than directly modifying a robot platform to include signaling lights, as in, an ARHMD interface might overlay virtual signaling lights on the robot in an identical manner. Alternatively, virtual imagery might be used to give anthropomorphic or zoomorphic features to robots that don't have this physical capacity (e.g., adding a virtual body to a single manipulator or a virtual head to an aerial robot). Finally, virtual imagery might be used to obscure or make more salient various aspects of robot morphology based on user role (e.g., an override switch might be hidden for normal users but visible for a technician). For example, robot morphology as a design variable that is fast, easy, and cheap to prototype and manipulate can enable a number of novel approaches; as opposed to traditional limitations on modifying robot morphology, such as prohibitively high cost, time, and/or other constraints.

Augmenting the user interface: In this paradigm, virtual imagery is displayed as an overlay directly in front of the user to provide an interface to the physical world, inspired by "window-on-the-world" AR applications and heads-up display technologies used for pilots. This interface-as-canvas metaphor may take a great deal of inspiration from traditional 2D interface designs, for instance providing supplemental information regarding robot bearing, attitude, GPS coordinates, or connection quality in the user's periphery while maintaining their view of the robot and preserving situational awareness of the environment. Further, the interface-as-canvas metaphor may uniquely supply egocentric cues, either directly in front of the user's view or in their periphery, compared to the exocentric feedback provided by augmenting the environment or robot. For example, user interface augmentations might include spatial mini-maps that provide information on the position or planned route of robots relative to the user, robot status indicators (battery level, task progress, task queue, etc.), or live video streams from a robot's camera(s).

These design paradigms may provide benefits over traditional interfaces. For example, ARHMDs support stereographic cues that can better leverage human depth perception, as opposed to monocular cues in traditional interfaces. Moreover, these paradigms enable interfaces that provide feedback directly in the context of where the robot is actually operating, reducing the need for context-switching between monitoring the robot and monitoring operations data and thus helping to resolving the perspective-taking problem.

Robot Teleoperation Embodiments

Various embodiments of the present technology explore using augmented reality technologies to help mediate robot teleoperation with novel forms of intuitive, visual feedback. Human interaction with robots, particularly non-autonomous and semi-autonomous robots, often involves some sort of teleoperation. Generally, teleoperation is the remote, electronic control of a robot or other type of machine. Teleoperation can include operation of a user interface through which the user can control some or all robot functions, such as motion, actuation of indicators or sensors, etc. Robot teleoperation can be a challenging task, often requiring a great deal of user training and expertise, especially for platforms with high degrees-of-freedom (e.g., industrial manipulators and aerial robots). Users often struggle to synthesize information robots collect (e.g., a camera stream) with contextual knowledge of how the robot is moving in the environment.

Robotic teleoperation, in which a user manually operates a robot, typically requires a high level of operator expertise and may impose a considerable cognitive burden. However, it also affords a high degree of precision and may require little autonomy on the part of the robot. As a result, teleoperation is still a dominant paradigm for human-robot interaction in many domains, including the operation of surgical robots for medical purposes, robotic manipulators in space exploration, and aerial robots for disaster response. Even in future systems, where robots have achieved a greater degree of autonomy than in current human-robot teams, teleoperation may still have a role. For instance, in "shared control" and "user-directed guarded motion" paradigms, robots enable users to input direct teleoperation commands, but use these commands in an attempt to infer user intentions, rather than following received inputs exactly, particularly if received inputs might lead to unsafe operation.

A substantial body of research has explored human performance issues in various forms of robotic teleoperation interfaces and mixed teleoperation/supervisory control systems. In particular, prior work has highlighted the issue of perspective-taking—the notion that poor perceptions of the robot and its working environment may degrade situational awareness and thus have a detrimental effect on operation effectiveness. This can be a problem for both remote teleoperation (as found in space exploration) and even when operator and robot are collocated (as may happen in search-and-rescue or building inspection scenarios).

Current interface designs may exacerbate this problem as live robot camera feeds are typically presented in one of two ways: viewed directly in display glasses or on a traditional screen (e.g., a mobile device, tablet, or laptop computer). While video display glasses may help users achieve an egocentric understanding of what the robot can see, they may degrade overall situational awareness by removing a third-person perspective that can aid in understanding operating context, such as identifying obstacles and other surrounding objects that are not in direct view of the robot. On the other hand, routing robot camera feeds through traditional displays means that, at any point in time, the operator can only view the video stream on their display or the robot in physical space. As a result, operators must make constant context switches between monitoring the robot's video feed and monitoring the robot, leading to a divided attention paradigm that bears similarities to texting while driving.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1 illustrates an example of an environment 100 in which some embodiments of the present technology may be utilized. As illustrated in FIG. 1, communications environment 100 may include one or more mobile robots 110, user 120 with a controller to teleoperate the robot 110 and an augmented reality system (e.g., head-mounted display 140) to provide contextual information to the user about the operations or intended operations of the robot. Data from the robot and/or controller may be communicated or retrieved from monitoring service 150. As such, in some embodiments, the robots 110, augmented reality systems, and controllers may include network communication components that enable these devices to communicate with remote servers or other portable electronic devices by transmitting and receiving wireless signals using licensed, semi-licensed or unlicensed spectrum over a communications network. In some cases, the communication network may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The communications network can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network.

The augmented reality system 140 can provide a direct line of sight to robot 110 or may reproduce the robot within the augmented reality system. User 120 can use controller 130 to develop commands for controlling robot 110. More specifically, in accordance with various embodiments, the teleoperation commands are intercepted and directed to the virtual surrogate, rather than directly controlling the physical robot as in traditional teleoperation. These commands can be processed by the augmented reality system and visualized on head-mounted display 140 before being implemented on the real robot 110. As such, an augmented reality display 142 may change over time. For example, as illustrated in FIG. 1, at time T1, augmented reality display 142 may only show the robot and other physical items within the room without any augmentation. The user may request the robot fly around the table and to aid user 120, various augmented reality information may be displayed.

For example, in response to the first command from the user, augmented reality system may display at time T2 a virtual line 147A directly below the robot connecting it to a double ring visualization laid flat on the ground that serves as a depth indicator. At time T3, display 142 can be updated to show a real-time virtual surrogate (RVS) showing where and how the robot would fly. Once the physical robot has arrived, additional contextual information 149A-149B (e.g., robot battery life, height, sensor readings, etc.) can be displayed at time T4 in augmented reality display 142.

Figure 2:
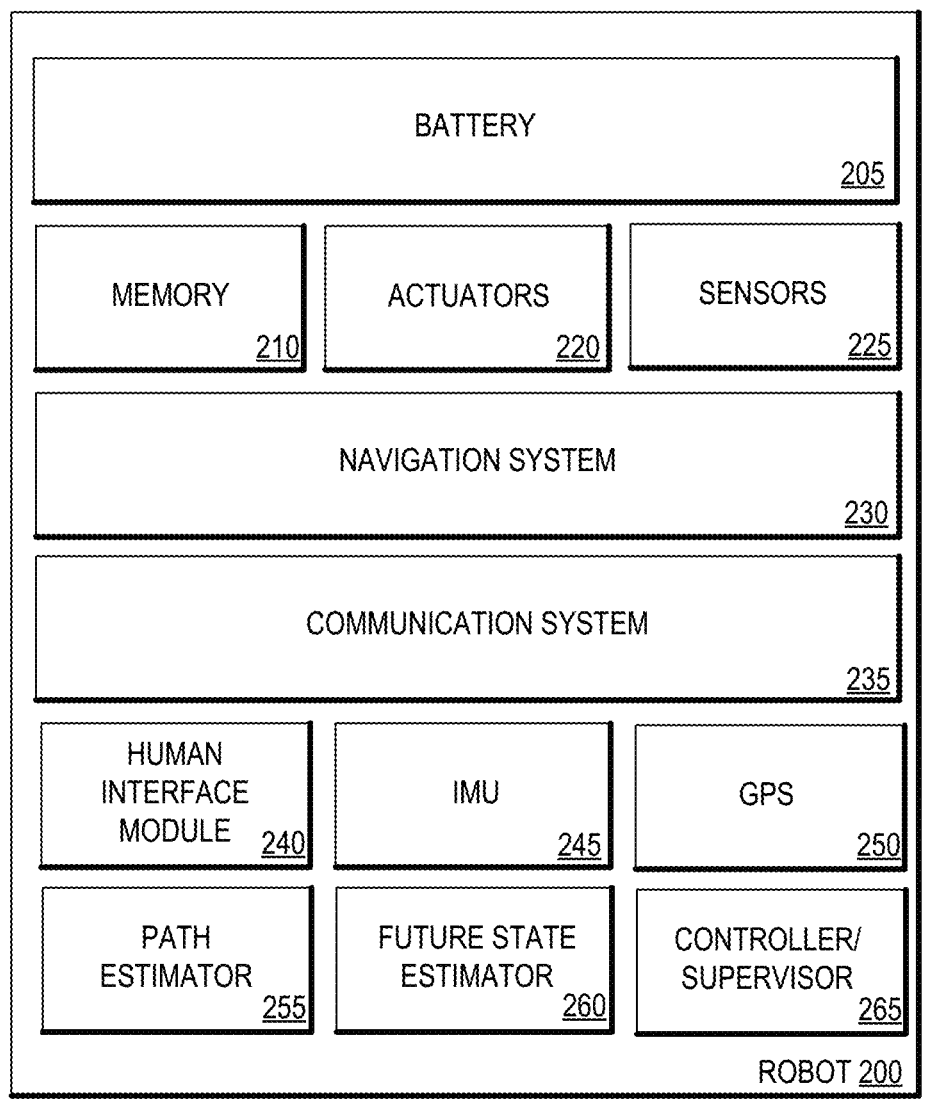
FIG. 2 illustrates a set of components for a robot that may be used in accordance with one or more embodiments of the present technology.

FIG. 2 illustrates a set of components for a robot 200 that may be used in accordance with one or more embodiments of the present technology. As shown in FIG. 2, robot 200 may include power supply 205 (e.g., rechargeable battery), memory 210 (e.g., volatile memory and/or nonvolatile memory), actuators 220, sensors 225, navigation system 230, communication system 235, human interface module 240, inertial measurement unit (IMS) 245, global positioning system (GPS) 250, path estimator 255, future state estimator 260, and/or controller supervisor 265.

In addition, robot 200 may include various processors such as application processors, various coprocessors, and other dedicated processors for operating robot 200. In some embodiments, the processors may include one or more dedicated or shared processors configured to perform signal processing (e.g. baseband processors for cellular communications), implement/manage real-time radio transmission operations (e.g., to nearby augmented reality devices such as a head-mounted display), or make other calculators or decisions. The processor(s) may be communicably coupled with memory 210 and configured to run an operating system, user interfaces, sensors 225, navigation system 230, communication system 235, human interface module 240, inertial measurement unit (IMS) 245, global positioning system (GPS) 250, path estimator 255, future state estimator 260, and/or controller supervisor 265, and/or other components. These processors, along with the other components, may be powered by power supply 205. The volatile and nonvolatile memories found in various embodiments may include storage media for storing information such as processor-readable instructions, data structures, program modules, or other data. Some examples of information that may be stored include basic input/output systems (BIOS), operating systems, and applications.

Actuators 220 may be responsible for moving and controlling various components or parts of robot 200. For example, in some embodiments actuators 220 may include, but are not limited to electric motors, linear actuators, piezoelectric actuators, servos, solenoids, stepper motors, and the like. Sensors 225 may be used to detect the states, events or changes in the surrounding environment and produce a corresponding signal that can be acted upon by various components within the robot. In some embodiments, sensors 225 may include one or more of the following: microphones, cameras, encoders, accelerometers, light sensors, motion sensors, radiation sensors, moisture sensors, chemical sensors, LIDAR, RADAR, and the like. Several of these sensors, for example, may be used as part of navigation system 230 which can be responsible for determining the navigations paths of robot 200 (e.g., in view of obstacles detected by sensors 225). Navigation system 230 may also receive inputs from external sources using communication system 235, IMU 245, and/or GPS 250 to determine optimal flight paths, detect and avoid objects, coordinate with other nearby robots using communication system 235, and the like. For example, IMU 245 can determine the orientation and velocity of robot 200.

Communication system 235 may include cellular and/or short-range communication components for sending and/or receiving information from other robots, augmented reality systems, controllers, data drops, and the like. Human interface module 240 can take input from humans and give output to humans. Human interface module 240 may use microphone to take verbal commands or queries from nearby humans. For example, if a human is walking by, the human can ask robot 200 to pause operations using human interface module 240 so that the human may safely pass. Upon detecting (e.g., using sensors 225) that the user has passed, robot 200 may resume requested operations. As another example human interface module 240 may display one or more visual queues (e.g., projections, holograms, lights, etc.) to aid nearby users of the intent of robot 200. In accordance with various embodiments, human interface module may use an augmented reality display. Controller/supervisor 265 can delay the implementation of one or more commands to ensure safety of the robot and nearby objects or humans.

Path estimator 255 can take current state (e.g., velocity, position, commands in queue, etc.) and estimate a current navigational paths robot 200 may take. Future state estimator 260 can generate a prediction of likely paths and activities robot 200 may take. Using human interface module 240, an indicator of those paths (e.g., a probabilistic indication) may be displayed (e.g., via an augmented reality display in use by a human) to help aid the human in understanding the anticipated path, intent, or activities of robot 200. For example, this information may be broadcast using communication system 235 to allow nearby head-mounted displays or other augmented reality systems to create visualizations for a user.

Figure 3:
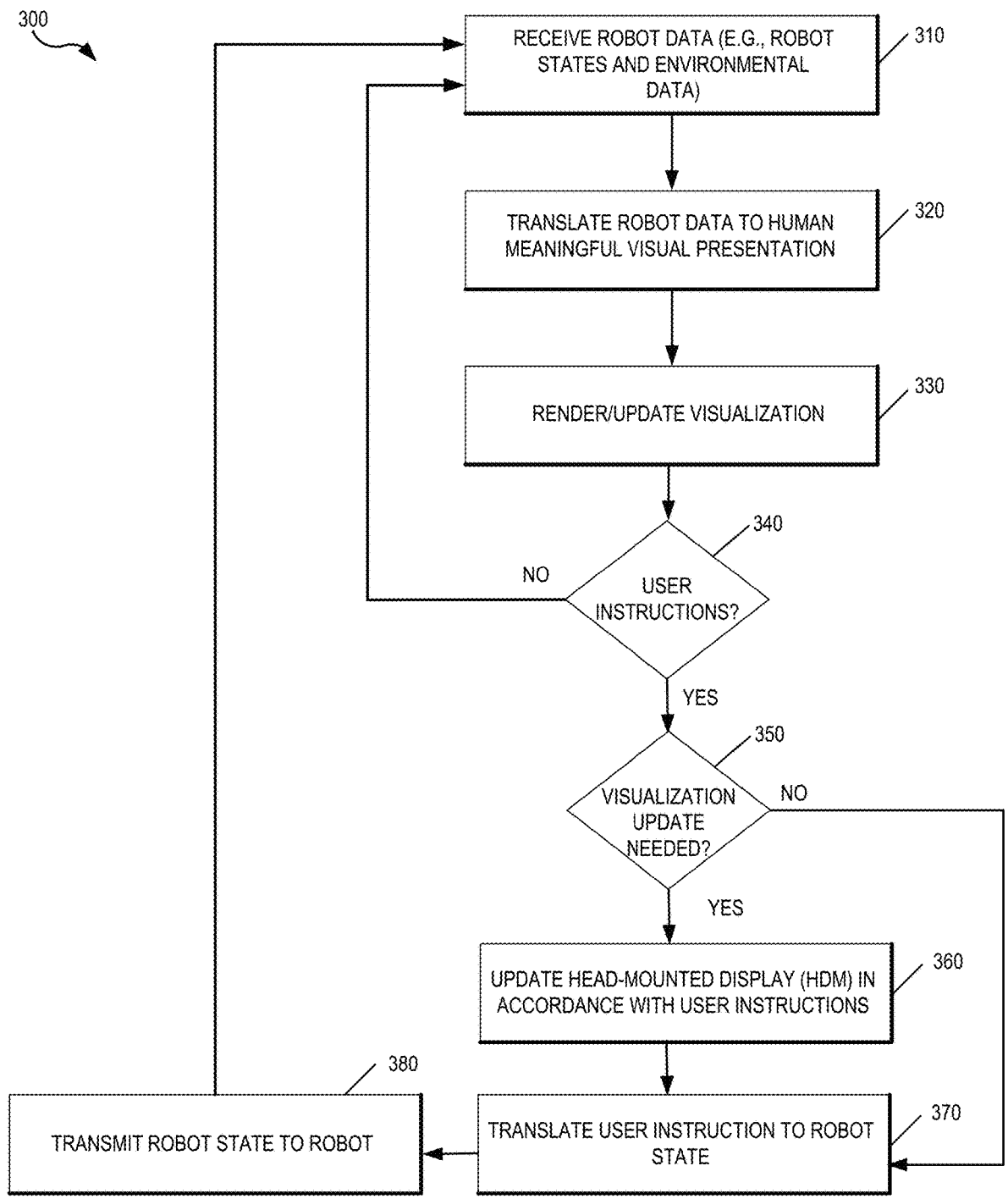
FIG. 3 is a flowchart illustrating a set of operations for operating an augmented reality interface in accordance with some embodiments of the present technology.

FIG. 3 is a flowchart illustrating a set of operations 300 for operating an augmented reality interface in accordance with some embodiments of the present technology. These operations may be implemented or executed by various components of the augmented reality interface such as, but not limited to, one or more processors, ASICs, displays, communication modules (e.g., Bluetooth, cellular, radio frequency, etc.) and/or other components. As illustrated in FIG. 3, receiving operation 310 can receive robot data including robot state information (e.g., orientation, velocity, position, acceleration, etc.) and environmental data (e.g., collected by one or more sensors). This data may be received directly from the robot or indirectly via an intermediate source (e.g., monitoring service 150, relay, satellite, etc.). In some embodiments, the source of the data may be selected and/or switched based on task information, delay tolerance, communication network properties (e.g., delay), and/or other information. In some embodiments, certain data may come directly from the robot while other data may be retrieved from an information data drop which can be identified (e.g., based on robot location) by the robot and/or by an augmented reality system. As such, some data may be retrieved from other sources.

Translation operation 320 can translate the data into a human meaningful visual presentation. The human meaningful presentation may indicate the position of the robot within the environment, objects within the environment, and/or collected data. For example, the human meaningful presentation may include virtual robots, waypoints, callouts, tables of data, and the like. Once the data has been translated into a human meaning visual presentation, update operation 330 can generate or update a rendering of the visualization via the augmented reality display.

The augmented reality system may be configured to monitor for instructions from the user (e.g., for teleoperating the robot). The system may be constantly monitoring for user instructions which may take various forms such as, but not limited to, voice commands, hand gestures, and the like. When determination operation 340 determines that no user instruction has been received, then determination operation 340 branches to receiving operation 310 where additional robot data is collected. When determination operation 340 determines that one or more user instructions have been received, then determination operation 340 branches to update determination operation 350. Update determination operation 350 can analyze the commands to determine whether an updated is needed. When update determination operation 350 determines that an update is needed, then update determination operation 350 branches to update operation 360 where the head-mounted display is updated in accordance with the user instructions. For example, the display maybe updated to provide contextual information, expected robot paths, identify hazards, zoom in or zoom out of specific areas, and the like.

When update determination operation 350 determines that an update is not needed or update operation 360 is complete, these operations branch to translation operation 370 where the instructions are translated to robot state information before being transmitted by transmission operation 380. The robot can then implement the commands based on the desire state information (e.g., using one or more controllers). Then the process repeats.

Figure 4:
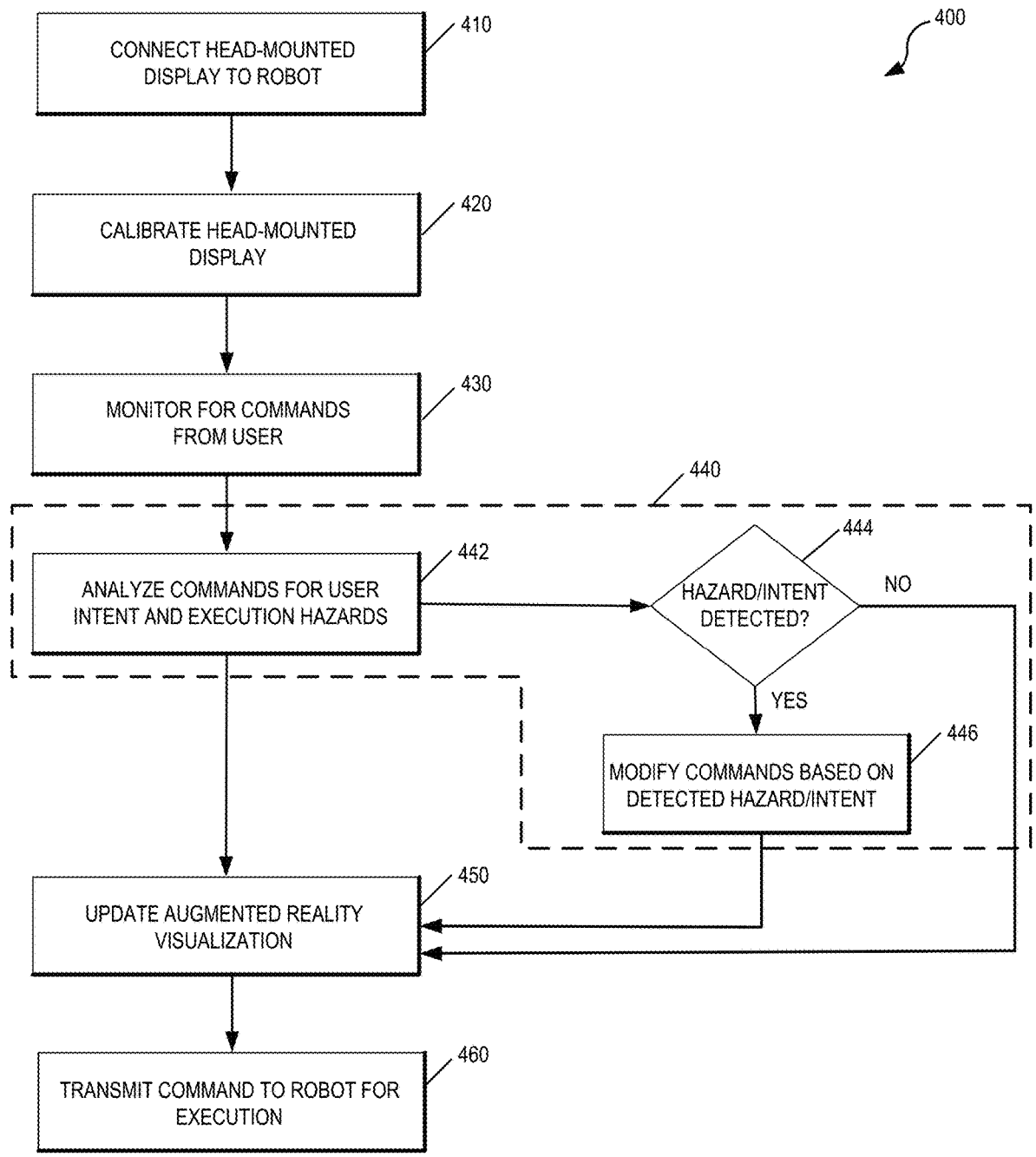
FIG. 4 is a flowchart illustrating a set of operations for hazard detection within an augmented reality interface in accordance with various embodiments of the present technology.

FIG. 4 is a flowchart illustrating a set of operations 400 for hazard detection within an augmented reality interface in accordance with various embodiments of the present technology. As illustrated in FIG. 4, connection operation 410 connects the head-mounted display to the robot. Calibration operation 420 can then be initiated to ensure the proper display of the physical and virtual objects. For example, some augmented reality interfaces include cameras to recreate a line of sight (e.g., for closed systems) and cameras to project or render contextual data onto the display. In either case, the augmented reality interface may need to identify the position and orientation of the camera in order to properly provide a perspective to the user.

Once the calibration is completed, monitoring operation 430 can monitor for user commands to control the robot. Some embodiments include a modification feature 440 which can identify user intent, potential hazards, or rule violations (e.g., stay below a maximum height, below a maximum speed, etc.) and automatically modify the commands to so that the robot is not damaged. This can for example, keep the robot within desired locational boundaries (e.g., identified by beacons or embedded in in rules) or prevent the robot from running into walls, people, or other obstacles within the environments.

As illustrated in FIG. 4, hazard detection feature 442 can first analyze the commands for user intent and execution hazards. For example, the user intent may be to scan for radiation along a wall. However, the user commands may end up running the robot into the wall at a specific point or missing an area. Determination operation 444 can determine whether a hazard or intent has been identified. In some embodiments, the identified intent or hazard may be immediately displayed on the augmented reality display. When determination operation 444 determines a hazard or intent has been identified, then determination operation 444 branches to modification operation 446 which modifies the commands based on the detected hazard or intent. As a result, the robot operates more intuitively and automatically avoids any hazards. When determination operation 444 determines no hazard or intent has been identified, then determination operation 444 branches to update operation 450 where the augmented reality visualization is updated. Update operation 450 may also be executed upon completion of modification operation 446. This visualization gives the user time to reject any modifications or change the commands before they are sent to the robot using transmission operation 460.

Figure 5:
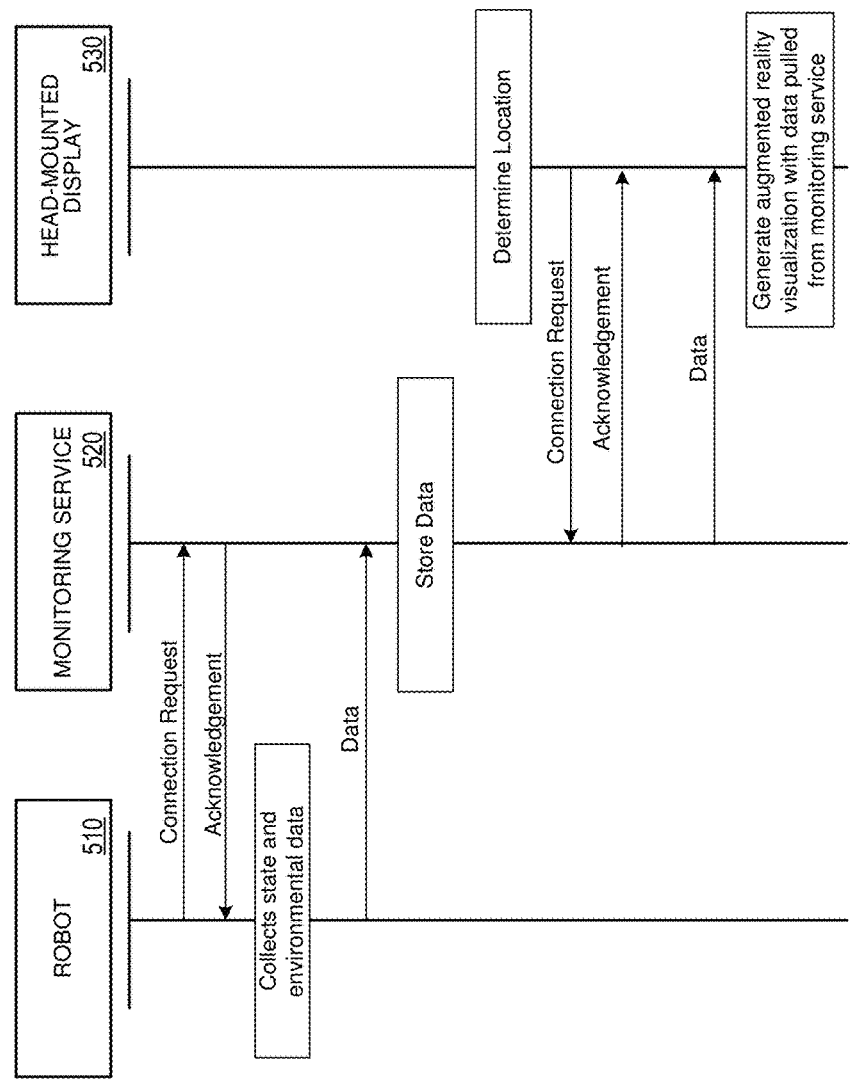
FIG. 5 is sequence diagram illustrating an example set of communications between various components of a teleoperated robot in accordance with some embodiments of the present technology.

FIG. 5 is sequence diagram 500 illustrating an example set of communications between various components of a teleoperated robot in accordance with some embodiments of the present technology. As illustrated in FIG. 5, robot 510 may connect to a monitoring service 520. The monitoring service 520 can acknowledge verify credentials and send an acknowledgement back to robot 510. The robot can collect and then report state and environmental data back to the monitoring service 520. The monitoring service can store the data. The head mounted display can then connect to the monitoring service and based its current location request data collected by the robot. This data can then be transmitted back to the head-mounted display where an augmented reality visualization can be generated with the data. For example, this may be useful to replay robot paths or data collection activities. Similarly, such a data drop feature may be useful as different robots may have different sensors and capabilities (e.g., thermal sensors, radiation sensors, motion sensors, etc.). As such, the collected information from multiple robots can be overlaid or provided so that a more coherent understanding of the environment is provided.

Figure 6A:
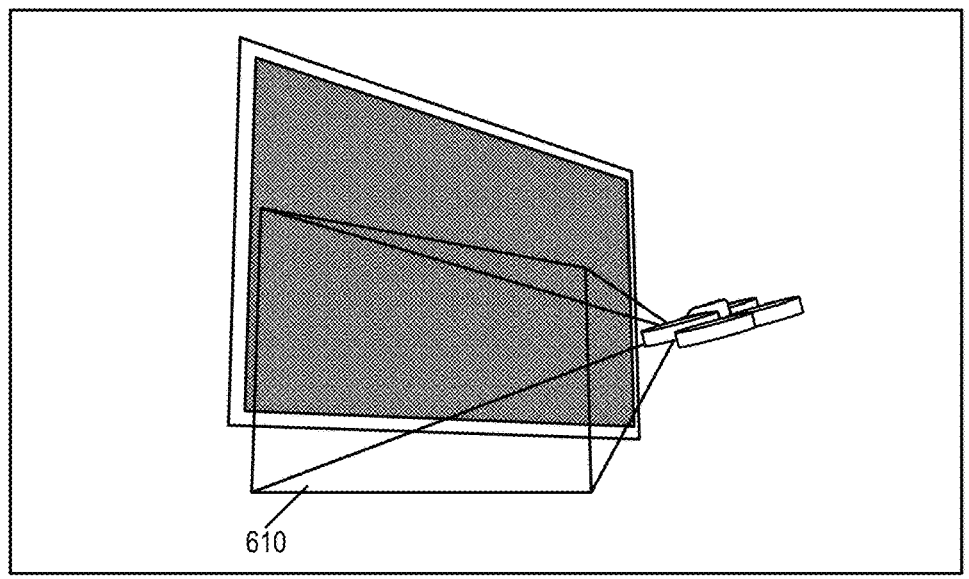
FIGS. 6A-6C illustrate augmented reality examples of teleoperation of a robot which may be used in accordance with one or more embodiments of the present technology.
Figure 6B:
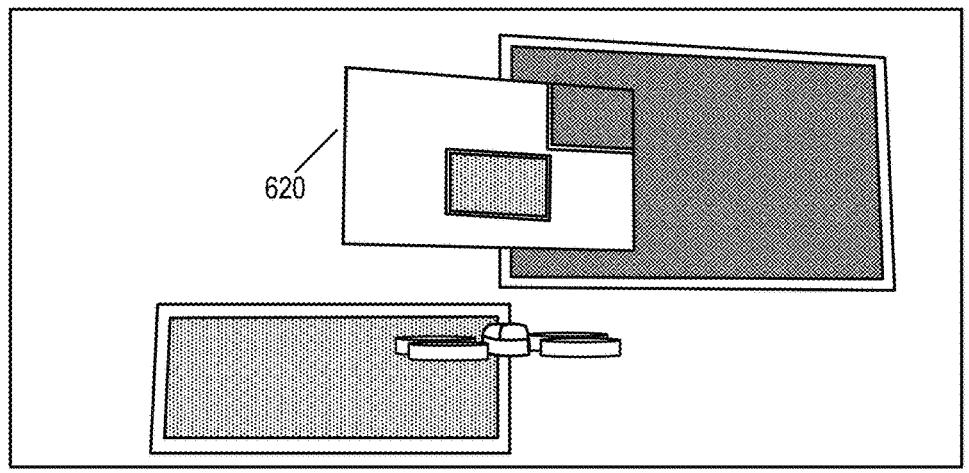
Figure 6C:
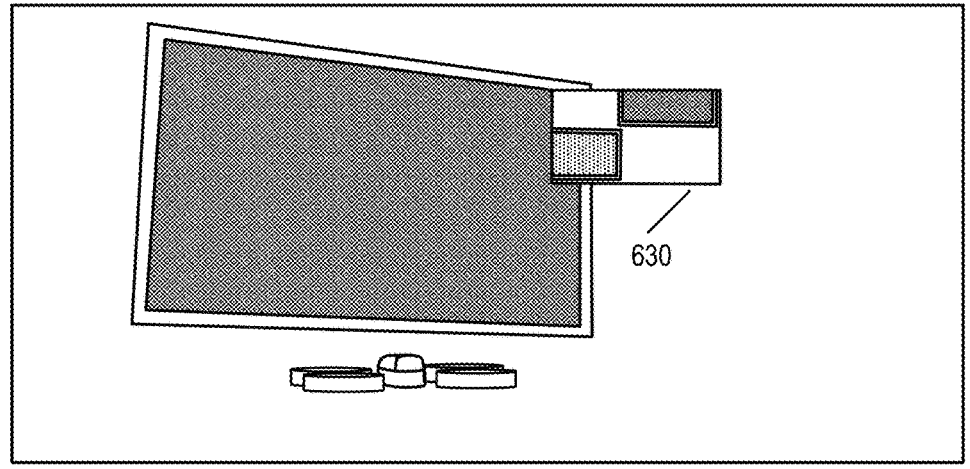

FIGS. 6A-6C illustrate augmented reality examples of teleoperation of a robot which may be used in accordance with one or more embodiments of the present technology. In FIG. 6A a Frustum design 610 is illustrate that augments the environment that gives users a clear view of what real-world objects are within the robot's field of view. FIG. 6B illustrates a Callout design 620 that augments the robot like a thought-bubble, attaching a panel with the live video feed above the robot. FIG. 6C illustrates a Peripheral design 630 that provides a window with the live video feed fixed in a user's periphery.

The Frustum design 610 provides an example of augmenting the environment. This design has a spatial focus as it provides virtual imagery that displays the robot's camera frustum as a series of lines and points, similar to what might be seen emanating from a virtual camera in computer graphics and modeling applications (e.g., Maya, Unity, etc.). The virtual frustum provides information on the robot's aspect ratio, orientation, and position, while explicitly highlighting what objects in the environment are within the robot's field-of-view. An additional benefit of this design is the ability to see a robot's sensor frustum even if there is inherently no real-time feedback and/or if taking aggregate measurements (e.g. LiDAR, air quality sensor, spectrometer, etc.).

The Callout design 620 represents an example of augmenting the robot itself with virtual imagery. It uses a metaphor inspired by callouts, speech balloons, and thought bubbles, along with prior work rendering real robot camera feeds within the context of virtual representations of the robot environment. As in, the robot's live camera feed is displayed on a panel with an orientation corresponding to the orientation of the camera on the physical robot, enabling information in the video to be spatially similar to the corresponding physical environment. This feed also provides implicit information regarding the distance between the robot and operator for a perspective projection transformation is applied to the video callout panel based on the calculated offset between the user and the robot. As a result, panel size is proportional to operating distance, just as perceived sizes of real-world objects are proportional to viewer distance. While this design decision may impair long-range operations, it may better support scalability and fan-out for operating multiple robots and provides a more realistic embedding of the information directly in the context of where the robot is collecting data at any given time. Alternate variations on this design might instead use billboarding, such that the callout panel always faces the operator. While this would ensure the operator always has a direct view of the robot's video stream, it may remove potentially useful orientation cues. Another design variation might use an orthographic projection, rather than perspective, such that the video panel always remains at a fixed size to the operator regardless of robot distance (this would create a similar effect to the Peripherals design, discussed below).

The Peripherals design 630 illustrates a potential method for an augmented-reality user interface that provides contextual information regarding the robot's camera feed in an egocentric manner. This design displays a live robot video feed within a fixed window within the user's view. Designers may specify fixed parameters regarding window size and location (e.g., directly in front of the user or in their peripheral view), or provide support for dynamic interaction that allows the user to customize window width, height, position, and even opacity. This work placed the window in the user's periphery, fixed within the upper-right corner of the user's view, in a manner inspired by ambient and peripheral displays.

Robot Teleoperation Embodiments Using Virtual Surrogates

Another set of embodiments uses AR to address robot teleoperation by generating and exploiting virtual surrogates. As used herein, a virtual surrogate is generally any suitable projection in the AR environment to represent a real robot. These embodiments indicate that AR might be used to provide users with an immersive virtual robot surrogate to control, rather than directly controlling a physical robot. Controlling a surrogate can enable users to better predict how their actions will affect the system and offer foresight into the eventual pose and position of the physical robot as it mimics the actions taken by the surrogate. Although such a system might be beneficial for operating a wide variety of robots (e.g., manipulators, underwater robots, etc.), this work examines interfaces for aerial robot teleoperation. Two main designs explore potential trade-offs in how such a surrogate interface might affect teleoperation effectiveness.

Figure 7A:
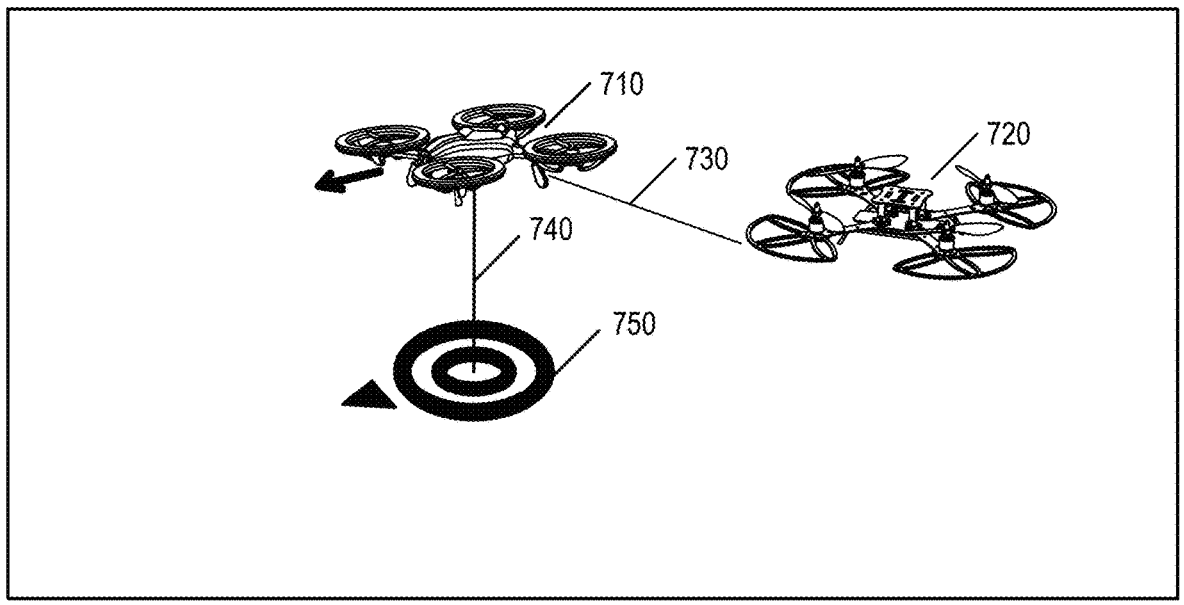
FIGS. 7A-7B illustrate augmented reality examples using real-time virtual surrogate (RVS) of a virtual aerial robot that shares a physical environment with a physically-embodied aerial robot in accordance with some embodiments of the present technology.

Various embodiments may use a real-time virtual surrogate (RVS). This design presents users with a virtual aerial robot that shares a physical environment with a physically-embodied aerial robot. FIG. 7A shows an example of a RVS implementation with virtual surrogate 710 and physically-embodied aerial robot 720. The virtual surrogate's appearance is modeled after the physical robot 720 and a virtual "fishing line" 730 can be displayed that connects the surrogate 710 to the physical robot 720. In addition, a virtual line 740 can be rendered directly below the robot connecting it to a double ring visualization 750 laid flat on the ground that serves as a depth indicator (mimicking drop shadow depth cues, which have shown to be effective in communicating depth in AR applications).

In this design, user teleoperation commands are intercepted and directed to the virtual surrogate, rather than directly controlling the physical robot as in traditional teleoperation. The virtual surrogate 710 is used as a setpoint or goal state for a planning algorithm running on the physical robot that causes the physical robot 720 to constantly "chase" the surrogate 710, stopping only if the Euclidian distance between the virtual and physical robots is zero. Any desired planning algorithm might be used, although the implementation opted for a simple PID controller. This design offers several tunable parameters, including the control speed of the virtual robot, the "chase speed" or delay time of the physical robot 720, and potentially any additional constraints to be enforced by the planner (e.g., motion smoothness); however from an implementation standpoint this system only requires that the surrogate's 6 DOF pose be converted from the augmented reality coordinate system that displays the surrogate to the planning coordinate system as a desired goal state for the onboard robot autonomy. Overall, the design helps users better understand how a physical robot 720 might react to user-issued commands in real time, giving the user a chance to evaluate and fix erroneous commands before the physical robot 720 actually executes them (given an appropriate "chase speed").

Figure 7B:
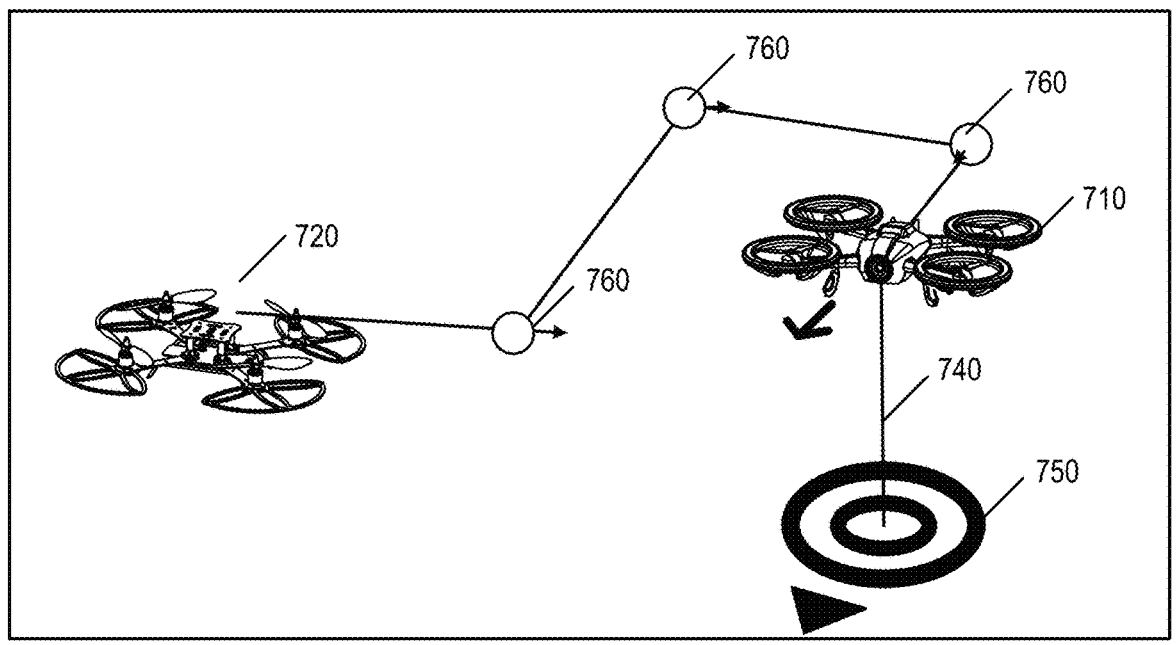
Figure 8B:
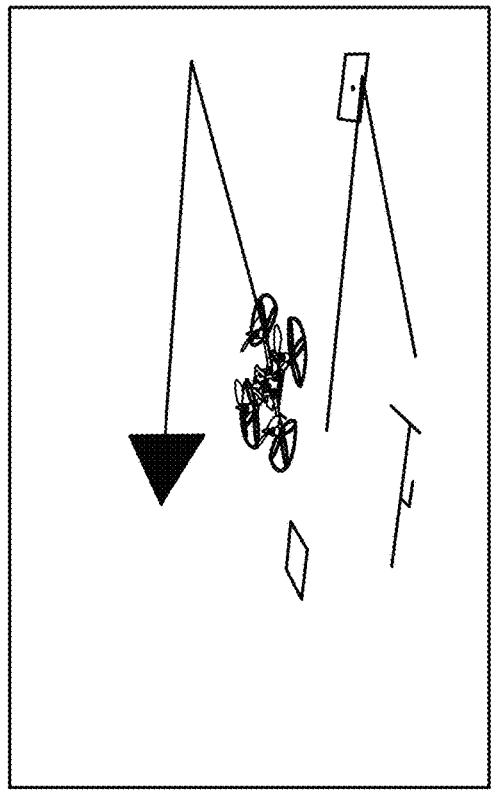
FIGS. 8A-8D shows some examples of an augmented reality displaying robot intent to mediate collocated human-robot interactions by visually conveying robot motion intent according to various embodiments of the present technology.
Figure 8D:
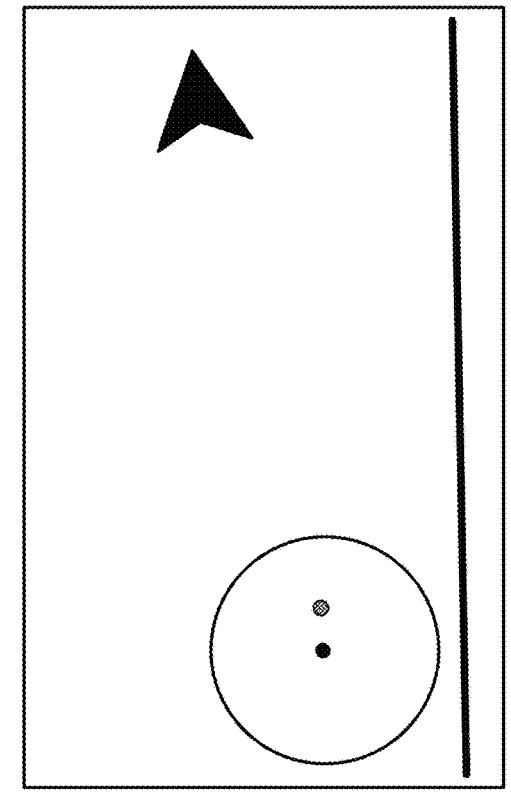
Figure 8A:
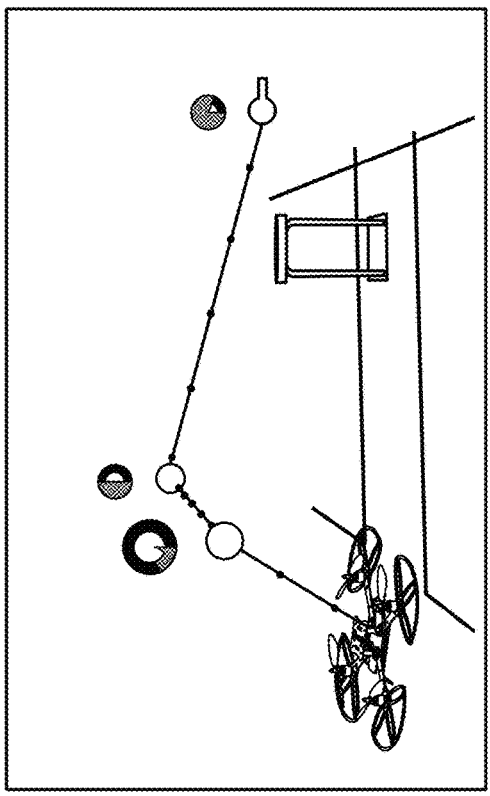
Figure 8C:
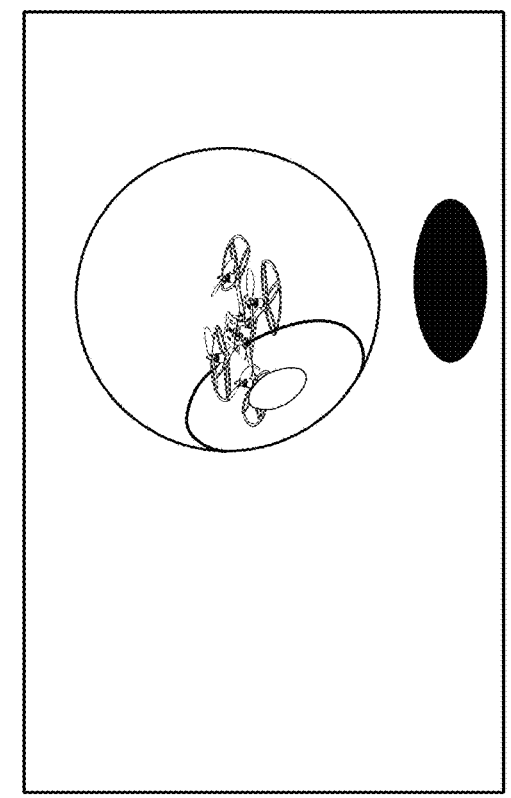

Some embodiments may use a waypoint virtual surrogate (WVS). This design extends the RVS model to provide more support for longer term planning, potentially at the cost of immediate precision control. FIG. 7B shows an example of a WVS implementation. As in the RVS model, the teleoperator controls a virtual robot surrogate rather than directly operating a physical robot. However, in the WVS paradigm, the physical robot 720 stays in place while the user operates the virtual surrogate 710 to create a plan by adding/deleting/editing virtual waypoints 760. At any point, the user can signal to the physical robot 720 to start executing the planned path, which is defined by a series of 6 DOF goal poses specified by the waypoints 760. The user can edit the most recent waypoint, can delete any planned waypoints, and can add additional waypoints on-the-fly. This interface is inspired by recent work in higher-level aerial robot interfaces and allows us to examine trade-offs between the RVS system and a more supervisory control scheme.

In addition to these two designs, a baseline teleoperation system can be implemented that enables users to directly pilot the physical robot rather than control a virtual surrogate. This system may be based on modern aerial robot teleoperation interfaces, requiring the user to use joysticks to move the robot in 3D space, although in the absence of user input the robot autonomously maintains a stable hover.

The designs used in various embodiments may be built on top of a backend coordination system developed as a custom application within the Unity engine. The basis of this system is a virtual aerial robot object within the Unity application, which is run on a Microsoft Hololens. The application translates user input from an Xbox controller to a segmented list of desired poses for the virtual robot, which then navigates the scene per the specifications of the waypoint list. For every iteration of the application engine's update loop, the virtual robot's 3D pose is sent from the HoloLens to an onboard system controlling the physical robot via UDP. Virtual robot pose values are transformed from Unity coordinates to real-world coordinates using a transformation matrix calculated a priori in an initial calibration procedure that calculates the relative origins and basis vectors for each coordinate system. After this transformation, pose values in the Unity scene correspond to the same positions in the user's real environment, enabling the physical robot to fly through the study space in a manner that matches the virtual drone.

In both the RVS and WVS systems, the autonomy that controls the physical robot currently may take the form of a PID loop that uses the virtual robot pose as a setpoint, although any robot planning algorithm could be used. The PID controller runs at 20 Hz and precisely controls the altitude, position, and orientation of the aerial robot. The current robotic platform (AscTec Hummingbird) lacks onboard sensing capabilities sufficient for accurate localization, thus the PID controller currently uses motion tracking cameras embedded in the environment to track the physical robot. User controls were implemented using an Xbox controller, with inputs matching the default AscTec controller that is representative of modern teleoperation systems (FIG. 8A-8D). Xbox controller sensitivity was calibrated to make it as similar as possible to the commercial teleoperation system and kept constant across all interface designs.

Robot Intent Embodiments

In addition to the embodiments described above, other embodiments include novel approaches to communicating robot motion intent using augmented realty-based mediation of human-robot interactions, such as by generating and presenting physically-embodied and/or other intuitive cues. Humans coordinate teamwork by conveying intent through social cues, such as gestures and gaze behaviors. When coordinating with robots, particularly autonomous robots (though such can similarly be the case for semi-autonomous or non-autonomous robots, in some cases), similar coordination can benefit from conveying robot intent. For example, when robots are making dynamic decisions about where and how they intend to move, those motions can be unpredictable to humans in the robots' environment; such that intuitive communication of the robots' intent can drastically improve safety and collaborative effectiveness. However, these methods may not be possible for appearance-constrained robots that lack anthropomorphic or zoomorphic features, such as aerial or spherical robots.

Effective collaboration requires that teammates quickly and accurately communicate their intentions to build common ground, coordinate joint actions, and plan future activities. For example, prior work in social, cognitive, and behavioral sciences has found that collaborative activities fundamentally depend on inter-predictability—the ability of each team member to rapidly understand and predict their teammate's attitudes and actions. In collocated human-robot teams, poor communication of robot intentions and planned movements can lead to critical breakdowns that degrade safety, task performance, and perceptions of robot usability.

As a result, providing support for this motion inference problem, where users may have difficulties understanding when, where, and how a robot teammate will move, represents a primary challenge towards achieving safe and usable robotic systems. In human-human teams, people use a variety of implicit and explicit cues, such as gaze, gestures, or other social behaviors, that communicate planned actions and movements to enhance team effectiveness and help maintain trust. Research has demonstrated that robots may also use social cues to convey both movement intent and affective state. However, it is not always clear how to apply these findings to robots that lack anthropomorphic and zoomorphic features, such as industrial robot manipulators or aerial robotic free-flyers.

Instead, alternative approaches can support motion inference, including generating legible motion trajectories, developing expressive motion primitives, verbalizing robot intentions using natural language, using projector-based or electronic display systems to provide additional information, and using light signals as explicit directionality cues. While such advances have shown promise in enhancing interaction safety and fluidity, a variety of constraints arising from environmental, task, power, computational, and platform considerations may limit their feasibility or effectiveness in certain contexts. For example, altering robot motions for legibility or expressiveness may not always be possible in dynamic or cluttered environments, natural language may not be a practical form of feedback in noisy environments (e.g., manufacturing warehouses or construction sites) or for robotic platforms that generate a great deal of noise (e.g., aerial robots), and projections may be difficult to render on non-flat surfaces, may not be salient in bright environments, and can be occluded by user or robot.

The robot motion inference problem may be considered as an analog to the "gulf of evaluation" issue that commonly arises between representations provided by a system and user abilities to interpret the system. This can be especially challenging for robots with high degrees of freedom, such as aerial robots. Other issues may compound this problem, including a lack of robot capabilities for communicating intention and goals using traditional methods and technological novelty/lack of mature mental models for understanding robot behaviors.

Previous research has suggested that effective robot communication enhances user perceptions of the robot's reliability, predictability, and transparency and may increase user willingness to accept and use new robotic technologies in work environments. Research has also shown that cuing robot intent can help users anticipate and predict robot directional motion faster, enabling them to respond more quickly in interactive tasks while increasing user preferences for working with robots. Legible motion that expresses a robot's intentions can further improve interaction fluidity and efficiency in collaboration between humans and robots.

Past research in robot design has examined how to effectively leverage users' prior experiences and mental models in human-human collaboration to bootstrap human-robot collaboration, imbuing robots with social behaviors such as gaze and gestures that people commonly use. Such behaviors have been explored for a variety of robots using anthropomorphic and zoomorphic features. For aerial robots that lack such features, prior work has examined expressive flight patterns, demonstrating that certain behaviors based on biological motion and principles from film and animation may help offset the lack of developed mental models for free-flying movement. Research has also explored more explicit cues, such as using lights as indicators and mixed-reality projection systems, finding that the use of projected imagery can be advantageous for communicating spatial intentions and instructions such as informing human collaborators of robots' intended path.

Although such work has shown promising benefits for improving human-robot interaction, including with aerial robots, prior methods are not without limitations. For example, expressive flight motions may not be feasible in constrained environments or effective if the user simply glances at the robot and witnesses only part of the motion. Projection systems rely on instrumenting the environment and face difficulties at distance, in chaotic environments, and run the risk of occlusion. By using AR as a means of conveying robot motion intent, embodiments described herein are not bound by these limitations.

Various embodiments are described herein for implementing novel robot intent approaches. FIG. 8 shows some examples of such approaches to using augmented reality to mediate collocated human-robot interactions by visually conveying robot motion intent. For example, four different approaches are illustrated in FIGS. 8A-8D for cuing aerial robot flight motion: a NavPoints approach, an Arrows approach, a Gaze approach, and a Utilities approach, respectively. Together, these approaches illustrate samples of different design framework paradigms and offer potential trade-offs in terms of information conveyed, information precision, generalizability, and possibility for distraction/interface overdraw.

While these are described with reference to aerial robots, similar design frameworks and methodologies, along with the main design metaphors and interface techniques, ca be applied to any suitable context for facilitating human-robot interaction (e.g., industrial robotic manipulators that also move with high degrees-of-freedom).

The NavPoints design (illustrated in FIG. 8A) is an example of augmenting the environment. This design has a spatial focus as it provides virtual imagery that displays the robot's planned flight path as a series of X lines and navigation waypoints, similar to what might be seen in traditional waypoint-delegation or supervisory interfaces. The lines connect the robot's current position to its future destinations in sequential order. Destination waypoints are visualized as spheres and indicate the robot's precise destinations in 3D space. Each destination sphere also renders a drop shadow on the ground directly below it, which has been shown to aid in depth estimations made by the user. Above each navigation point are two radial timers. An inner white timer indicates when the drone will arrive at that location and the outer dark blue timer indicates when the robot will leave that location. Smaller spheres travel along the lines, moving in the same direction and velocity the robot will travel between destinations, thus providing an anticipatory cue for future robot velocity and direction. Information displayed by this design regarding velocity and arrival/departure timings is thus explicitly displayed for the user.

The Arrow design (illustrated in FIG. 8B) provides an alternate example of how virtual imagery might augment a shared environment. While the NavPoints design provides users with a great deal of information, it may be distracting or confusing to the user due to potential overdraw. The Arrow design takes a more minimal approach, focusing specifically on communicating temporal information inspired by and common user experiences with modern GPS systems. The virtual imagery consists of a blue arrow head that travels through 3D space in the exact path the robot will eventually take X seconds in the future. As the arrow moves, a line is left behind that traces the arrow's path back to the robot. Using this line, users can explicitly see the path the arrow has taken, which the robot will eventually follow. The line the arrow creates renders a drop shadow on the ground directly beneath it. Information displayed by this design regarding velocity and arrival/departure timings must be inferred by the user by watching the discrete movements of the arrow through space.

The Gaze design (illustrated in FIG. 8C) represents an example of augmenting the robot itself with virtual imagery. This design is inspired by prior research that has demonstrated the remarkable potential of gaze behaviors for conveying intent, even for aerial robots, as well as prior designs for robotic blimps and research in robotic telepresence that has explored a metaphor of treating an aerial robot as a "floating head". This design provides virtual imagery that completely alters the robot form by overlaying a X-meter diameter white sphere with a pupil directly over the aerial robot, effectively transforming the robot from a multirotor into a "flying eye." While moving between destinations, the eye model stares at its current destination until it enters a predetermined distance threshold of Y meters between itself and the current destination, at which point the eye turns and focuses on the robot's next destination. Gaze shifts such as this have been shown useful in predicting action intent in humans. Through these shifts in focus, the robot's immediate destinations are preemptively revealed to the user.

If the robot is to remain stationary at a destination for longer than Z seconds, the lens over the normally transparent pupil becomes opaque. When the now stationary robot is within Z seconds of departing, the lens fades in back to transparent. This fade in is done as a linear interpolation over the course of Z seconds. This lens fade in/out effect notifies the user how long the robot will remain stationary and was inspired by accommodation—shifts as ciliary muscles contract and relax in human gaze as focus switches between near and far targets—and lens focusing in traditional cameras. The size of the display was chosen to help users more easily determine gaze direction at near and far distances from the robot. The back of the sphere directly behind the pupil is rendered as flat to help users infer the rotation of the eye when not facing the robot head on. Finally, the eye casts a drop shadow on the ground directly below it.

Another design (illustrated in FIG. 8D) illustrates a potential method for augmenting a user interface to provide contextual information in an egocentric manner. This design is inspired by peripheral utilities, such as minimaps, radar, and offscreen indicators that often augment pilot interfaces, robot control interfaces, videogame interfaces, and military applications. This design displays a 2D circular "radar" fixed at the bottom left corner of the ARHMD display. The user is displayed as a blue dot that is always centered within the radar, while the robot is rendered as a red dot on the radar relative to the user's location. The size of the robot's radar dot is directly proportional to its current height. The detection radius, X, of the radar can be customized by the interface designer or adjusted by the user. When the robot is in the user's field-of-view (FOV), it is overlaid with a targeting box, when not in the FOV, an off-screen indicator appears in the form of a directional arrow. This arrow is rendered along the side of the ARHMD display pointing to the location of the off-screen robot. Both radar and targeting box/off-screen indicator provide the user with the means to rapidly locate the robot relative to themselves.

Robot Teleoperation Experiment

The inventors conducted a 4×1 between-participants experiment to evaluate how designs might affect user teleoperation of a collocated flying robot. The study tasked participants with operating a Parrot Bebop quadcopter to take several pictures in a laboratory environment as an analog to aerial robot inspection and survey tasks. The independent variable in this study corresponded to what type of teleoperation interface the participant used (four levels: Frustum, Callout, and Peripherals designs plus a baseline). In the baseline condition, participants still wore an ARHMD (to control for possible effects of simply wearing a HMD), but did not see any augmented reality imagery. Instead, participants used the Freeflight Pro application, the official piloting interface supplied by Parrot for the Bebop robot (the platform used in this experiment). Dependent variables included objective measures of task completion and subjective ratings of operator comfort and confidence.

Our overall experimental design was inspired by contexts where free-flying robots might assist with environmental inspections and surveys within human environments, as is already common practice among drone hobbyists and might soon be found within domains including disaster response, operations on-board the International Space Station, and journalism. In the study, participants operated an aerial robot in a shared environment. The environment measured 5 m×5 m×3 m and contained motion tracking cameras utilized for precisely tracking the robot to ensure ARHMD visualizations were displayed at the appropriate locations for the Frustum and Callout designs (motion tracking was not needed for the baseline condition or the Peripherals design).

Two inspection targets adorned the walls of the experimental environment in the form of rectangular frames colored in pink and purple with an orange outline. The larger pink target is 1.78 m×1.0 m and positioned 1.3 m from the ground to its bottom edge. The smaller purple target is 1.35 m×0.76 m and positioned 0.34 m from the ground to its bottom edge. The aspect ratio of the targets exactly matches that of the robot's camera. This gives participants the ability to capture exact photos of the targets. It is relatively easier to capture a perfect image of the pink target as it is larger and higher off the ground, while the purple target is more challenging due to its smaller size and shorter height from the ground (operating an aerial robot close to the ground is more challenging due to instabilities resulting up-drafts reflected off the ground).

To capture a perfect image of the purple target requires the robot to fly in closer proximity to both the wall and ground, which increases chances of crashes due to operator error. Participants were tasked with piloting an aerial robot to take photos of the targets in a set order, first inspecting the larger pink target and then the smaller purple target. Participants were directed to prioritize capturing imagery as fast as possible, as precisely as possible, and with the fewest number of total pictures as possible. In terms of precision, participants were instructed to record a photo that captured the entirety of the pink or purple target region, with as little additional imagery (e.g., the orange target frame or other parts of the scene) in the photo as possible. Participants were allowed to determine when they had captured what they believed to be a suitable image such that they could then move on to the next target. Overall, this task mimicked an environmental inspection mission, requiring that participants operate a line-of-sight robot to take off from a set starting position, inspect a series of targets in order, and land the robot within six minutes. If participants crashed the robot it was reset to the starting position, after which they were allowed to continue performing the task as long as time remained.

The experimental apparatus and implementation are described for context. The robotic platform used a Parrot Bebop quadcopter as an aerial robot for the experiment. The Bebop is a popular consumer-grade "drone" appropriate for flying indoors and outdoors with a digitally stabilized 14MPixel HD camera and autonomous hovering capabilities. The ARHMD platform included a Microsoft Hololens as the ARHMD. The Hololens is a wireless, optical see-through stereographic augmented reality HMD with a 30°× 17.5° FOV, an inertial measurement unit, depth sensor, ambient light sensor, and several cameras and microphones that support voice input, gesture recognition, and head tracking. The HoloLens was chosen due to its emerging popularity, ease of access, ability to support hands-free AR, and high potential as a model for future consumer ARHMD systems. Implementing teleoperation interfaces included participants in the baseline condition wearing the HoloLens ARHMD, but without receiving augmented reality visualizations. Instead, they controlled the robot via the "Free Flight Pro" application on an iPad. The Free Flight application represents the default control software for the Bebop robot and is also developed by Parrot (the Bebop manufacturer). It is a popular application (with an average 3.8 rating from 24,654 reviews on the Android App Store) and is highly representative of modern aerial robot control interfaces used in practice today that aim to pro-vide users with an intuitive control scheme. The application provides touchscreen controls for taking off/landing, positioning/orienting the robot, and recording pictures/video, all overlaid on the live video feed from the robot. In the absence of user input, the application ensures the robot continues to hover and automatically lands the robot upon detecting low battery.

Unfortunately, limitations in the robot platform and Freeflight application prevented the inventors from using it as the control input in the other experimental conditions: if Freeflight is connected to the robot, it is not possible to also stream the robot's video feed to any other device. This makes it impossible to use the Freeflight interface with the Callout or Peripherals designs. Instead, in the AR conditions, participants received AR feedback while operating the robot using a wireless Xbox One controller. The button/joystick mappings were set on the Xbox controller to match the touchscreen controls in the Freeflight Pro application and calibrated Xbox controller sensitivity to make it as similar to the Freeflight controller as possible (FIG. 7). As with the Freeflight Pro app, in the absence of user input the robot would continue to hover in place.

The augmented reality visuals for the Frustum, Callout, and Peripherals designs were implemented using the Unity game engine and deployed as an application that ran on the Microsoft HoloLens. The Frustum and Callout designs require a real-time understanding of robot position, such that virtual imagery can be correctly displayed in the environment relative to the robot (Frustum) or directly as an attachment to the robot itself (Callout). To accomplish this, motion tracking cameras were used to precisely localize the robot, feeding in robot position and orientation values to the HoloLens application. The Peripherals design did not rely on the motion tracking setup, however both the Callout and Peripherals designs displayed a live video feed from the robot's camera as a virtual object in augmented reality. To accomplish this, the robot's video stream was wirelessly broadcast to the Hololens by routing it through a desktop computer. This method yielded an average framerate of 15 frames per second (FPS), slightly slower than the ~30 FPS provided to participants in the baseline condition by the Freeflight Pro application.

Each of the three main designs tested have several parameters that may be tuned by designers or users; however, each of these parameters were fixed to control for potential variance in the experiment. The Frustum was displayed as red lines in a wireframe view, as opposed to a shaded or highlighted region to minimize potential occlusion of the environment or task targets. The Callout was de-signed to emanate from the top of the robot, such that the video feed always appeared 13.5 cm above the center of the Bebop as the operator flew it throughout the environment. The Peripherals design set the camera feed window to the upper-right corner of the user's view.

The experiment included 48 participants (28 males, 19 females, 1 self-reported non-binary). Males and females were evenly distributed across conditions. Average participant age was 22.2 (SD=7.2), with a range of 18-58. On a seven-point scale, participants reported a moderate prior familiarity with both aerial robots (M=3.48, SD=1.6) and ARHMDs (M=3.38, SD=1.75).

Procedurally, the experiment took approximately 30 minutes and consisted of five main phases: (1) introduction, (2) calibration, (3) training, (4) task, and (5) conclusion. First, participants were given a high-level overview of the experiment and signed a consent form, then were led into the experimental space. Participants were then fitted with the Hololens and either given an iPad running the Freeflight Pro application or an Xbox controller depending on condition. At this point, the appropriate HoloLens application was also started based on condition (Frustum, Callout, or Peripherals, with no AR application for baseline participants). Participants then received instructions on the controls (i.e., button-maps for the Freeflight and Xbox controllers) and had two minutes to practice piloting the robot. After two minutes were up, the robot landed and was placed in a fixed starting position for all participants.

Participants then completed the main task of inspecting the targets in order. Participants received six minutes to pilot the robot such that it took off from a fixed starting location, captured images of the targets, and then landed, simulating an environmental inspection mission. If participants crashed the robot, it was reset to the starting position and participants could continue the task if time still remained. Once participants completed the task or the six minutes allotted to the task ran out, participants were given a post-survey on their experience and then debriefed.

Objective, behavioral, and subjective measurements were made to characterize the utility of the interface designs. Several objective aspects of task accuracy were measured, including: accuracy—measured by how well participant photographs captured the inspection target, each of which consisted of a visible, uniform grid of 297 mm×210 mm rectangles, which allowed us to measure the accuracy rate by com-paring the rectangle grid in a perfect shot with the photos captured by participants; completion time—measured by the total flight time (lower times mean more efficient performance); and operational errors—the number of times they crashed the robot or otherwise caused it to land prematurely.

First-person and third-person video were also recorded to analyze behavioral patterns in participant actions. Two coders annotated video data from each interaction based on when participants were able to view the robot and when they were not. Data was divided evenly between coders, with an overlap of 15% of the data coded by both. Inter-rater reliability analysis revealed substantial agreement between raters (Cohen's κ=0.92). This coding enabled us to calculate distracted gaze shifts—the number of times the participant was distracted looking away from the robot during the task; and distraction time—the total time spent not looking at the robot. Both measures were relevant, as many small gaze shifts might be just as detrimental as fewer but longer periods of distraction.

Several 7-point scales were constructed using Likert-type questionnaire items to capture subjective participant responses. These scales measured how the interface designs affected participant comfort (3 items, Cronbach's α=0.86), confidence (5 items, Cronbach's α=0.95), and perceptions of task difficulty (5 items, Cronbach's α=0.93) while operating the robot. Participants also gave open-ended responses regarding their experiences.

Participants evaluated perceived usability using the System Usability Scale (SUS), an industry standard ten-item attitude survey. SUS scores below 68 are considered below average, scores above 68 are considered above average, and scores above 80.3 are considered in the top 10th percentile.

Data from objective and subjective measures was also analyzed using a one-way Analysis of Variance (ANOVA) with experimental condition (i.e., teleoperation interface) as a fixed effect. Post-hoc tests used Tukey's Honestly Significant Difference (HSD) to control for Type I errors in compared effectiveness across each interface.

Figure 9:
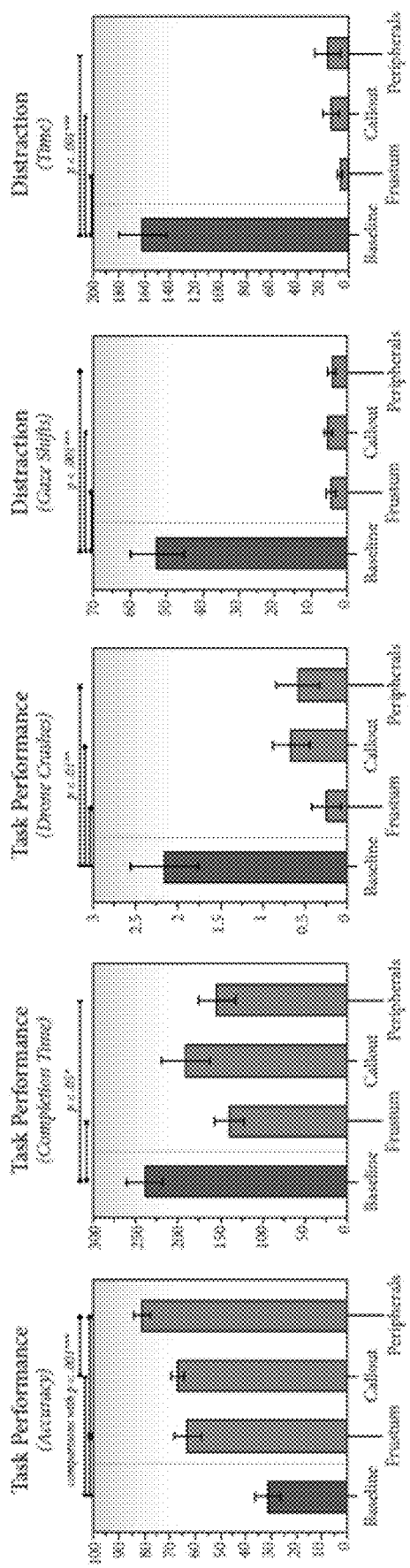
FIG. 9 shows objective results indicating that the augmented reality interface designs of various embodiments of the present technology improved task performance in terms of accuracy and number of crashes, while minimizing distractions in terms of number of gaze shifts and total time distracted.

FIG. 9 shows objective results indicating that the augmented reality interface designs improved task performance in terms of accuracy and number of crashes, while minimizing distractions in terms of number of gaze shifts and total time distracted. (*), (), and (*), denote comparisons with $p<0.05$, $p<0.01$, and $p<0.001$ respectively.

Objective Results—Objective task metrics were analyzed to confirm that the designs were useful in allowing participants to teleoperate a collocated aerial robot more effectively. Results found a significant main effect of design on task performance scores for accuracy, $F(3, 44)=25.01$, $p<0.0001$. Tukey's HSD revealed that the Frustum (M=63.2%) and Callout (M=67.0%) interfaces significantly improved inspection performance over the baseline interface (M=31.33%), with the Peripheral design (M=81.1%) showing even further benefits by significantly outperforming both Frustum and Callout (all post-hoc results with $p<0.0001$). The results also found a significant main effect of design on task completion time, $F(3, 44)=3.83$, $p=0.016$. Post-hoc comparisons against the baseline (M=239.70 s) revealed that participants were able to complete the task significantly faster using the Frustum (M=140.69 s), $p=0.017$, and Peripherals (M=154.44 s), $p=0.050$, but not the Callout (M=191.09 s), $p=0.434$. Examining occurrences when users crashed the robot, results indicated a significant effect of interface design on operational errors, $F(3, 44)=9.24$, $p<0.001$ with each of the AR designs significantly reducing the number of crashes compared to the baseline (Frustum: M=0.250, $p<0.0001$; Callout: M=0.667, $p=0.003$; Peripherals: M=0.584, $p=0.001$; Baseline: M=2.17).

Behavioral metrics were also analyzed to understand user distraction, indicating a significant main effect of interface design on number of distracted gaze shifts, $F(3,44)=40.28$, $p<0.001$, and on total distraction time, $F(3, 44)=48.72$, $p<0.001$. Post-hoc tests showed that all three AR designs significantly decreased both the number and length of distractions compared to the baseline (all comparisons at $p<0.0001$).

Subjective Results—Participants rated the several facets regarding their experiences teleoperating an aerial robot. Results indicated a significant effect of interface design on user comfort working with the robot, $F(3, 44)=8.12$, $p<0.001$, with users more comfortable using the Frustum (M=5.58), $p=0.002$, Callout (M=5.87), $p<0.001$, and Peripherals (M=5.14), $p=0.019$, designs than the current Freeflight interface (M=3.64). Results also indicated a significant effect of design on confidence operating the robot $F(3, 44)=7.93$, $p<0.001$. Post-hoc comparisons against the baseline (M=3.0) revealed that users were significantly more confident using the Frustum (M=5.02) and Callout (M=5.0) design, both $p<0.001$, but not the Peripherals (M=4.0), $p=0.179$. Results also indicated a significant effect of design on perceived task difficulty, $F(3, 44)=4.17$, $p=0.011$, with participants finding the task significantly easier using the Frustum (M=4.03), $p=0.027$, Callout (M=4.13), $p=0.016$, and Peripherals (M=3.78), $p=0.047$, designs than the baseline (M=2.5).

Perceived interface usability was evaluated with the SUS. Results indicated a significant effect of interface design on SUS total score, $F(3, 44)=7.38$, $p<0.001$. Tukey's HSD revealed each of the AR designs had significantly higher usability ratings over the baseline (Frustum: M=80.21, $p<0.001$; Callout: M=76.88, $p=0.003$; Peripherals: M=71.04, $p=0.041$; Baseline: M=55.0).

The results of the experiment described above generally demonstrated significant improvements over a modern interface that is representative of popular designs currently in use. Each design enabled users to complete an inspection task faster and more accurately than with the robot's default control interface, while also leading to safer operation with fewer crashes. Overall, users rated these designs as largely more favorable in terms of usefulness and their own comfort and confidence when operating the robot. For example, the embodiments of interface designs described herein enabled users to get live video feedback without taking their eyes off the robot, whereas conventional designs tend to force users to make context switches that sacrifice either situational awareness of the robot in the environment or their ability to closely monitor the robot's camera feed at any given time.

In this experiment, as in real-world deployments, users needed an understanding of both of these aspects to successfully complete their task. This was especially important as participants attempted to inspect the smaller, pink target that was closer to the ground. The size and placement of this target required that participants navigate fairly close to both the wall and ground, which can lead to difficulties for the robot's internal stabilization mechanism, potentially causing the robot to drift while hovering. Observing the experimental recordings reveals that participants using the Frustum, Callout, and Peripherals designs were able to quickly notice drift and re-stabilize the robot. However, participants in the baseline condition often took much longer to realize the robot was drifting as they were staring at the tablet which provided the robot video feed, rather than monitoring the robot itself. By the time these participants noticed the drift, it was often too late to correct, leading to crashes, landings, or loops of overcorrection, giving participants the impression that the robot was difficult to control.

Robot Teleoperation with Virtual Surrogates Embodiments

The inventors conducted a 3×1 within-participants experiment to evaluate how RVS and WVS designs might affect user experiences when teleoperating a collocated flying robot. The study protocol had participants navigate an AscTec Hummingbird quadcopter throughout a laboratory environment such that they visited and "collected data" from six points of interest while simultaneously completing a quiz to mimic the task of operating a robot while simultaneously analyzing robot-collected data on-the-fly. The independent variable in this study corresponded to what type of teleoperation interface the participant used: a baseine teleoperation system in which Xbox controller input directly controlled the physical robot, the realtime virtual surrogate design, or the waypoint virtual surrogate system. Dependent variables included objective measures of average completion time, response time, and interface usage, as well as subjective rankings directly comparing each interface and overall ratings of perceived multitasking ability, stress, and ease of use.

The experiment represents a scenario in which a user teleoperates a line-of-sight aerial robot to collect and analyze environmental data, inspired by analogous use cases for aerial robots in disaster response, construction, and space exploration. The experimental environment in which participants operated an aerial robot measured 6 m×10 m×6 m and contained several motion tracking cameras which were used as part of a backend system to localize the robot and ensure safe operation.

The experimental task required users to complete two subtasks: (1) piloting an aerial robot such that it visited and "collected data" at a series of "points of interest" (POIs) and (2) periodically completing a quiz to represent the notion of analyzing data that the robot had just collected. The POIs were designated by six stools placed within the environment. Participants were instructed to pilot the robot to visit each stool in a certain order and maintain a stable hover over the stool for a period of five seconds to simulate collecting environmental data. The stools were arranged in two rows of three. In each row, the distance between the first and second POIs was 2 meters, while the second and third POIs were separated by 4 meters. To examine user experiences operating the robot over a variety of distances, the environment was divided by tape into two zones: a user-allowed area and user-restricted area. As a result, at times the user could operate the robot in closer proximity (when visiting stools in the user-allowed area), while at others be forced to operate the robot at more of a distance (when visiting POIs further away in the user-restricted area).

In all conditions, while teleoperating the robot, participants wore a Microsoft HoloLens ARHMD that presented the order in which to visit the POIs using augmented reality imagery, with POI order designated by virtual numbers (1-6) that appeared above each stool. In all conditions, participants also received AR feedback in the form of a virtual progress bar that would fill up as participants hovered on top of POIs indicating that the robot was "collecting data." If participants left the POI early (designated by a virtual cylinder outlining POI area), their progress was lost and they would have to re-position the robot such that it was within the POI radius and the "data collection" (i.e., progress bar) would restart.

After completing each POI, participants were presented with the data analysis subtask, in which they were asked to answer two multiple choice quiz questions. These questions simulated the notion of participants analyzing the "data" the robot had just collected at the POI. The quiz questions appeared on a smartphone mounted to the user's arm (users selected preferred arm), again simulating the idea of using a robot to collect and analyze data in the field. Each quiz question presented users with a sentence of roughly 25 characters and required users to select the answer corresponding with the number of vowels the sentence contained from four options. Participants were not forced to complete the quiz immediately, instead they were free to continue piloting the robot to a new POI and complete the "data analysis" whenever they chose. However, each completed POI would add another two questions to the quiz queue. Successfully completing the overall task required that participants collect data from all POIs and answer all quiz questions.

An AscTec Hummingbird quadcopter was used as the aerial robot for this experiment. The Hummingbird is a popular research "drone" appropriate for flying indoors and outdoors. Various embodiments may use a Microsoft HoloLens as the ARHMD and the Unity game engine used to develop and deploy the applications. The HoloLens is a wireless, optical see-through stereographic augmented reality HMD with a 30°×17.5° FOV, an inertial measurement unit, depth sensor, ambient light sensor, and several cameras and microphones that support voice input, gesture recognition, and head tracking. The HoloLens was chosen due to its emerging popularity, ease of access, ability to support hands-free AR, and high potential as a model for future consumer ARHMD systems.

A total of 18 participants (11 males, 7 females) took part in the study. The population sample contained both novice users and users experienced at piloting aerial robots. In total, 7 participants represented expert users who were recruited from a local "Drone Club," 8 participants reported moderate familiarity with aerial robots, while 3 participants had little to no experience operating flying robots. Average participant age was 20.7 (SD=3.59), with a range of 18-27.

The study took approximately 80 minutes, and consisted of four main phases: (1) introduction, (2) prototype evaluation (which had 6 sub phases and was repeated 3 times for each participant), (3) summary evaluation, and (4) conclusion. In the first phase, (1) participants signed a consent form, were led into the experimental environment, and read an instruction sheet detailing the task and task rules. In the next phase, (2) participants completed the main experimental task (visiting POIs to "collect data" and answering quiz questions) using one of the three interfaces (baseline, real-time virtual surrogate, or waypoint virtual surrogate). Each participant completed this phase three times, once using each interface, with interface order counterbalanced across participants to mitigate potential transfer effects such as learning or fatigue that may be introduced due to the within-participants design.

This phase consisted of 6 sub-phases: (A) participants first watched a short 60 s tutorial video that presented the interface design they were going to use, covering both the controls and what the visual feedback looked like. (B) Next, the ARHMD application was then started, calibrated, and fitted on each participant, with a researcher getting verbal confirmation that participants were able to see the augmented reality imagery as intended. (C) Participants then had 2 minutes to test the interface, giving them time to become familiar with the controller, augmented reality imagery, and the robot. (D) Participants then performed the main experimental task in which they piloted the aerial robot to a series of POIs, hovering at each for 5 seconds, and then performing the quiz. POI order was kept constant to control for potential variation across trials. As described above, participants were free to complete POIs and quizzes in the order they chose (e.g., participants might complete all POIs and then all quizzes or perform quizzes concurrently while piloting the robot), although participants were unable to start a quiz prior to completing the POI corresponding to that quiz. Participants were instructed that their goal was to complete the full task (visiting all POIs and completing all quizzes) as quickly as possible. (E) After completing the full task, the experimenter administered a questionnaire that surveyed participants regarding the interface design they had just used. After completing the survey, participants repeated this entire phase twice more. After completing the main task using each interface design, (4) participants completed the full task once final time as part of a summary evaluation. During this phase, participants were able to freely switch between any of the interface designs at any point, as many times as they desired, enabling us to record objective data regarding user preferences regarding which interface they preferred to use. (5) After completing the summary evaluation, participants were given a final post-survey that collected data on their overall experience and subjective rankings comparing each interface.

Both objective and subjective measurements were used to evaluate the designs. Several objective aspects of task performance were measured, including: completion time—measured by time elapsed in seconds between the task start and finishing the last data analysis quiz; response time—the average time elapsed in seconds between scanning a POI and completing its associated data analysis quiz for all six points of interest; and design usage—measured by the percent of total task time that participants used each interface design during the summary evaluation phase in which they completed the task while free to switch between designs.

Data was also collected from a number of subjective measurements. After using each interface, participants evaluated perceived interface usability using the System Usability Scale (SUS), an industry standard ten-item attitude survey. SUS scores below 68 are considered below average, scores above 68 are considered above average, and scores above 80.3 are considered in the top 10th percentile. In addition to the SUS, a number of scales were constructed from 7-point Likert-style questionnaire items to measure participant perceptions and preferences. Scales rated perceived ease of distal operation (2 items, Cronbach's a=0.77), ease of precise positioning (2 items, Cronbach's a=0.77), ability to multitask (3 items, Cronbach's a=0.94), and stress (5 items, Cronbach's a=0.91). Following the summary evaluation phase, participants were asked to directly compare the three designs, ranking them relative to one other (1 (best)-3 (worst)). Participants ranked the designs in terms of easy to learn and would want to use in the future. Finally, qualitative feedback was obtained through open-ended questions posed to each participant as part of the various surveys. Questions included (but not limited to) "what made performing the task easier," "what made performing the task harder," and "how did this design impact your ability to control the drone." The objective measures, SUS, and constructed rating scales were analyzed using a repeated-measures analysis of variance with experimental condition (i.e., interface design) as a fixed effect, with condition order included as a covariate to control for potential variance that might arise from ordering effects. Post-hoc tests used Tukey's Honestly Significant Difference (HSD) to control for Type I errors in comparing effectiveness across each interface. Participant rankings of each interface were analyzed with a nonparametric Kruskal-Wallis Test with experimental condition as a fixed effect. Post-hoc comparisons used Dunn's Test for analyzing specific design sample pairs for stochastic dominance.

Figure 10:
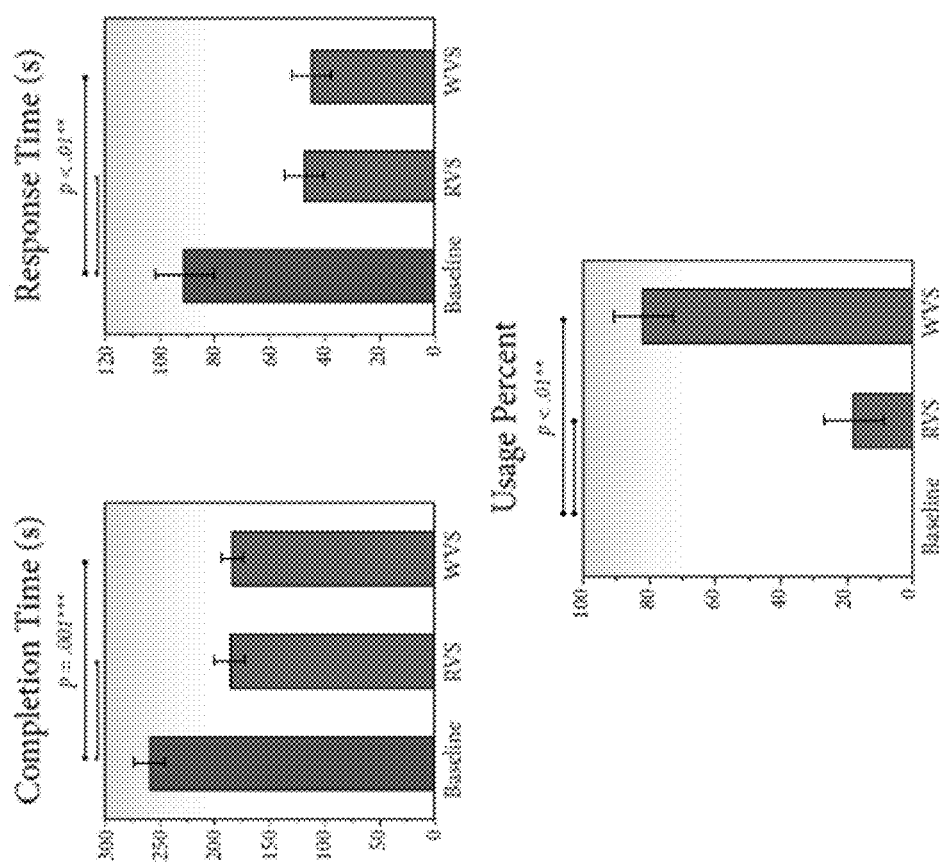
FIG. 10 illustrates objective results that the RVS and WVS systems used in some embodiments showed improvement over the baseline in all objective measures.

FIG. 10 illustrates objective results that the RVS and WVS systems showed improvement over the baseline in all objective measures.

Objective Results—Task performance metrics were analyzed to determine if the AR surrogate designs helped participants teleoperate a collocated aerial robot more effectively. A significant main effect of robot interface design was found on task completion time, $F(2, 45)=13.65$, $p<0.001$. Using Tukey's HSD, we found the Realtime Virtual Surrogate (M=186.39 s), p=0.001 and Waypoint Virtual Surrogate (M=184.39 s), p=0.001 designs significantly improved completion time over the baseline interface (M=260.11 s). A significant main effect of design was found on response time, $F(2, 45)=8.43$, $p<0.001$. Post-hoc comparisons against the baseline (M=90.56 s) revealed that participants were able to respond to the data analysis quizzes significantly faster using the RVS (M=47.44 s), p=0.004, and WVS (M=44.61 s), p=002, designs. Finally, a significant main effect was found in regard to design usage during the final summary evaluation task $F(2, 51)=34.92$, $p<0.001$. Tukey's HSD revealed participants used WVS (M=81.94%) significantly more than the Virtual Surrogate (M=18.06%) and Baseline (M=0%) designs (all comparisons at p<0.001), with not a single participant ever using the baseline design at any point.

Subjective Results—Perceived interface usability was evaluated with the SUS. A significant main effect of interface design was found on SUS total score, $F(2, 45)=5.91$, p=0.005. Tukey's HSD revealed both of the AR designs had significantly higher usability ratings over the baseline (RVS: M=86, p=008; WVS: M=83.6, p=022; Baseline: M=66.8). Participants rated the designs in terms of ease of teleoperation. A significant main effect was found in terms of ease of distal operation, $F(2, 45)=5.56$, p=0.007. Tukey's HSD confirmed both RVS (M=6.25), p=0.016, and WVS (M=6.25), p=0.016 were rated significantly higher than the baseline (M=4.61). Finally, there was a significant main effect in regard to design and ease of precise positioning, $F(2, 45)=4.9$, $p=0.012$. Post-hoc analysis revealed that RVS (M=6.31), $p=0.012$ was rated significantly higher than the baseline (M=4.72), while WVS (M=5.89), $p=0.075$ was not found to be significant at the $a=0.05$ level. Participants also rated their perceived ability to multitask using each interface. We found a significant main effect of interface design on these ratings, $F(2, 45)=22.93$, $p<0.001$. Tukey's HSD exhibited that both RVS (M=5.42), $p<0.001$ and WVS (M=6.10), $p<0.001$ were rated significantly higher than the baseline (M=3.00). The post-task surveys also collected data on perceived stress. A significant main effect of interface was found on stress ratings, $F(2, 45)=6.87$, $p=0.003$, with Tukey's HSD showing the baseline (M=3.27) design elicited more perceived stress than either of the AR designs (RVS: M=2.14, $p=0.013$; WVS: M=1.99, $p=0.004$). Finally, following the summary evaluation phase, participants were asked to compare the designs directly to one another, ranking them from 1 (best) to 3 (worst) across how easy they found the interfaces to learn and which design they would like to use in the future. No significant main effect was found in participant rankings of how easy the designs were to learn, $H=5.07$, $p=0.079$. However, a significant main effect was found regarding which design participants would want to use in the future, $H=16.85$, $p<0.001$. Post-hoc analysis with Dunn's Test found that participants consistently ranked both RVS (M=1.89), $p=0.017$, and WVS (M=1.5), $p<0.001$ higher than the baseline (M=2.61), although no significant difference was observed in comparing the relative rankings between RVS and WVS.

Generally, the surrogate AR designs allowed users to complete the task and respond to the data analysis quizzes faster than a baseline teleoperation interface modeled after existing systems in common use today. Both the RVS and WVS designs provide for previewing robot actions, which has the benefit that if users are happy with the preview, their time is freed to supervise the robot while completing other concurrent tasks. This perspective is also supported by our subjective results, in which the surrogate designs outperformed the baseline in terms of perceived ability to multitask and wanting to use the surrogate interfaces in the future. Overall, both novice and expert participants appreciated that the surrogate designs provided a preview of robot motions and found the previews to be quite helpful when operating the robot. These findings help support the hypothesis that providing support for the goal/action/evaluation cycle can improve teleoperation.

Robot Intent Experiment

The inventors conducted a 5×1 between-participants experiment to evaluate how designs affect user interactions with a flying robot in a shared workspace. The independent variable in this study was the type of AR feedback the user received (five levels: a baseline and the four designs described above). In the baseline condition, participants still wore an ARHMD, but did not see any virtual imagery. Instead, participants in this condition were informed that the robot has a distinct "front," which always indicates its direction of flight; this baseline behavior meant the robot would always orient itself to the direction of travel, leveraging the only physically-embodied cue that the robot's default morphology provides. All conditions shared this baseline orientation behavior. Dependent variables included objective measures of task performance and efficiency as well as subjective ratings of communication clarity and robot usability.

The overall experimental setup was inspired by contexts where free-flying robots might assist with logistics management in manufacturing settings in the near future. In the study, participants worked with an aerial robot in a shared environment designed to mimic a small warehouse. The environment measured 20 ft×35 ft×20 ft and contained motion tracking cameras utilized for precise robot navigation to ensure participant safety. Six workstations were placed within the physical space in two rows of three. Each workstation had at least five feet of surrounding free space and supported a container of colored beads. Each bead container held only one color of beads, corresponding to either green, black, yellow, white, blue, or red. Participants were tasked with collecting beads from these containers and fastening them together to make beaded strings while sharing the environment with an aerial robot. Participants were instructed that their goal was to make as many beaded strings as possible in exactly eight minutes. Each completed string consisted of twenty-five beads. There were individual instructions for each string describing the target color and amount of beads to be used. For example, one string might ask for 10 blue beads, 5 red beads, and 10 green beads. Along with these directions, participants were instructed on three additional rules:

1. Participants could only pick up one bead at a time and could only place beads on strings while at the workstation.
2. Participants could collect the colors in any order, but once they chose a color they had to remain at that color station until they had strung all the beads of that color, as indicated by the string instructions (i.e., colors could not be intermixed).
3. The robot would occasionally visit each workstation (ostensibly to monitor bead supply). If the robot flew to the workstation where participants were working, participants were required to move at least 2 meters away from the workstation (i.e., moving back to social distance as informed by proxemics) and wait until the robot left before continuing (i.e., giving workstation priority to the robot).

This task was designed to emulate an assembly task that might be found in a warehouse, with shared resources (i.e., the workstations) between the user and robot. As the robot had priority at workstations, the task required that participants understand and predict robot intent to best plan their activities and maximize task efficiency.

The experiment used an AscTec Hummingbird robot as the free-flying platform (FIG. 8). During the experiment, the robot flew autonomously to pre-programmed waypoints throughout the experimental environment using a PID controller that received input on robot location using a motion capture system. During the study, a researcher stood by with an emergency kill switch that could disarm the robot for safety, but this was never required. The experiment used a Microsoft Hololens as the ARHMD. The HoloLens is a wireless, optical see-through stereographic augmented reality HMD with a 30°×17.5° FOV, an inertial measurement unit, depth sensor, ambient light sensor, and several cameras and microphones that support voice input, gesture recognition, and head tracking. The HoloLens was chosen due to its emerging popularity, ease of access, ability to support hands-free AR, and high potential as a model for future consumer ARHMD systems.

A custom experimental framework was developed for implementing the designs, deploying them to the Hololens, and ensuring that visualizations are properly synchronized with robot behaviors. The four designs described above were prototyped using Unity, a popular game and animation engine for designing and developing virtual and AR applications. A waypoint system was also developed that enables the specification of a sequential list of desired robot destinations (i.e., target robot positions and orientations in 6 degree-of-freedom space), desired velocity to travel to each destination, and wait time at each destination (possibly zero). An invisible virtual drone object was added to the Unity scene that navigates the scene per the specifications of the waypoint list, and whose motions control the physical robot's flight.

For every iteration of the game engine's update loop, the virtual drone's 3D pose are sent from the HoloLens to the backend system controlling the physical robot via UDP. Virtual drone pose values are transformed from Unity coordinates to real-world coordinates using a transformation matrix calculated a priori in an initial calibration procedure. After this transformation, pose values in the Unity scene correspond to the same positions in the user's environment, enabling the physical robot to fly through the study space in a manner that matches the virtual drone, turning the Unity application into a waypoint delegation interface. The waypoint list was populated by randomly selecting workstation destinations, wait times, and velocities from the ranges listed above to ensure there was no flight path pattern for participants to learn. This list was populated once prior to the start of the study as a whole, then held constant for all participants across all conditions to remove potential variance arising from different robot trajectories. The total time to travel through the waypoint list took 8 minutes to complete, which was equivalent to the total task duration (chosen due to battery/flight time capabilities).

Heuristic parameters were also tuned in implementing the designs. NavPoints has the potential to display a full flight path of all waypoints, but early pilot tests revealed this led to a distracting case of overdraw. Instead, only a portion of the robot's path was shown, which dynamically updated such that the visualization always displayed three waypoint destinations ahead of the robot's current position. The Arrow design was implemented such that the blue arrow always stayed fifteen seconds ahead of the aerial robot (i.e., showing the robot's position 15 s in the future). The heuristic parameters selected for eye movement in the Gaze design were derived from research into human gaze behaviors and set to a distance threshold of 2 m and fade threshold of 3 s. The radius of the eye model was set to 0.6 m so that the hologram overlaid the robot's body in its entirety. The "radar" in the Utilities design used a detection radius of 15 m to cover the full area of the experiment environment.

A total of 60 participants (40 males, 20 females, evenly balanced across conditions) took part in the study. Average participant age was 20.7 (SD=4.8), with a range of 18-45. On a seven-point scale, participants reported a moderate prior familiarity with aerial robots (M=3.75, SD=1.71), but a low familiarity with ARHMDs (M=2.65, SD=1.83). The study took approximately 30 minutes and consisted of five phases: (1) introduction, (2) training, (3) calibration, (4) task, and (5) conclusion. (1) First, participants signed a consent form and were led into the task space. (2) Next, participants each read identical instruction sheets detailing the task and task rules. Participants assigned to any of the four AR design conditions, then watched a corresponding 60 s tutorial video that provided a brief instruction on the AR feedback they would receive based on the relative novelty of ARHMD technology.

Only participants assigned to the baseline condition were told verbally that the robot always moves towards where its marked "front" is facing. (3) The ARHMD application was then started, calibrated, and fitted on each participant, including participants assigned to the baseline condition (even though they didn't receive AR feedback). (4) Participants then performed the main task for eight minutes, making as many bead strings as possible while sharing the environment with a collocated aerial robot. (5) Once eight minutes of task time was completed, participants were told to stop and were given a post-survey on their experience.

A combination of four objective and subjective measurements were used to characterize the effects of the designs. Objective task efficiency was measured by the total time participants spent waiting while interrupted by the robot, which could be avoided by planning their work with an understanding of robot intent (lower times indicate better performance/efficiency). In calculating task efficiency, time variance were removed in users backing away from the stations. The interruption timer only began when the robot was directly overhead a station. This allowed for consistent measuring between participants. A number of scales were constructed from 7-point Likert-style questionnaire items to measure subjective participant perceptions and preferences. Scales rated interface design clarity (4 items, Cronbach's $\alpha=0.85$), perceptions of the robot as a teammate, both as a personal work partner (4 items, Cronbach's $\alpha=0.91$), and as a potential work partner for others (2 items, Cronbach's $\alpha=0.83$), and overall design usability (2 items, Cronbach's $\alpha=0.73$). Qualitative feedback was obtained through open-ended questions posed to each participant as part of the concluding questionnaire to describe their experiences "working with the AR user interface", "working alongside the aerial robot", and "completing [their] task". Data was analyzed using a one-way Analysis of Variance (ANOVA) with experimental condition (i.e., interface design) as a fixed effect. Post-hoc tests used Dunnett's method to control for Type I errors when evaluating the ARHMD designs against the baseline condition, while Tukey's Honestly Significant Difference (HSD) test compared effectiveness across each design.

Figure 11:
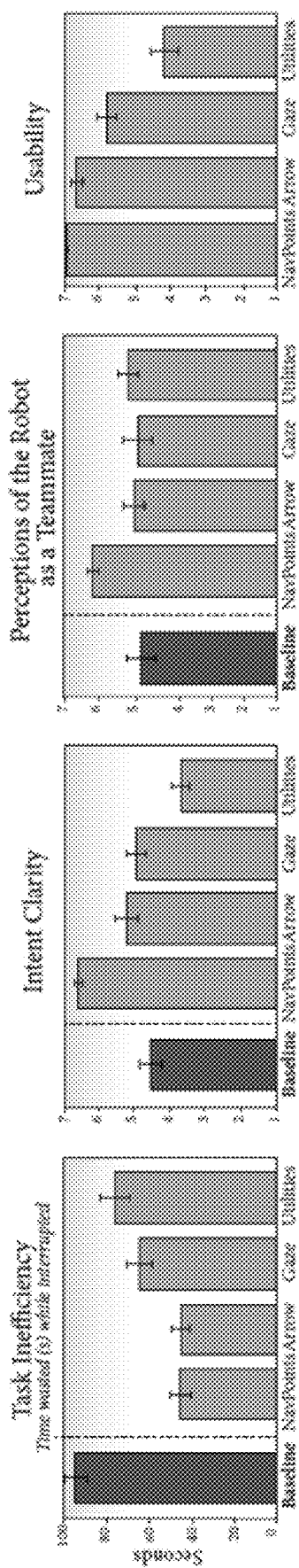
FIG. 11 shows objective results that the NavPoints, Arrows, and Gaze designs improved task performance by decreasing inefficiencies and wasted time.

FIG. 11 shows objective results that the NavPoints, Arrows, and Gaze designs improved task performance by decreasing inefficiencies and wasted time. Subjective results reveal that NavPoints outperformed other designs in terms of user preferences and perceptions of the robot.

Objective Results—The task performance metric was analyzed to confirm that the designs were useful for participants to quickly and accurately deduce robot intent and plan their own activities more effectively. A significant main effect of ARHMD interface design was found on total time spent interrupted, $F(4, 55)=12.56$, $p<0.001$. Comparing the performance of each design to the baseline with Dunnett's multiple comparison test indicated that total time lost to interruptions significantly decreased using NavPoints ($p<0.001$), Arrow ($p<0.001$), and Gaze ($p=0.003$), but not Utilities ($p=0.104$).

Subjective Results—Participants rated the several facets regarding the communication of robot movement intent. A significant effect of design was found on perceived communication clarity, $F(4, 55)=11.04$, $p<0.001$. Post-hoc comparisons using Dunnett's test revealed that the NavPoints design was rated significantly higher than the baseline ($p<0.001$), but we did not find significant effects from the other designs. Participant responses to the robot were analyzed in terms of how they might view it as a collaborative partner in a work environment. A marginal ($0.1>p>0.05$) main effect of design was found on participant perceptions of the robot as a good work partner for themselves, $F(4, 55)=2.48$, $p=0.054$. A significant main effect of design was also found on participant perceptions of the robot as a good work partner for others, $F(4, 55)=2.54$, $p=0.049$. Post-hoc comparisons revealed NavPoints was the only design to significantly improve perceptions of the robot as a personal work partner ($p=0.03$) and as a work partner for others ($p=0.029$) over the baseline. Finally, the designs were compared to one another along a usability metric of how the displayed virtual imagery affected participant understanding of robot movement intent. A significant main effect of design was found on perceived usability for understanding intent, $F(3,44)=25.32$, $p<0.001$. Post-hoc comparisons using Tukey's HSD found that NavPoints ($M=6.96$), $p<0.001$, Arrow ($M=6.67$), $p<0.001$, and Gaze ($M=5.83$), $p<0.001$, were ranked as significantly more helpful than Utilities ($M=4.21$). NavPoints was also found to be rated as significantly more helpful than Gaze, $p=012$, with Arrow ranked marginally more helpful than Gaze, $p=0.092$.

The NavPoints, Arrow, and Gaze designs improved task performance by reducing inefficiency; participants were able to better predict robot intent and plan their own actions accordingly to reduce the length of times they spent interrupted and unproductive. However, the Utilities model did not provide similar improvements over the baseline condition. This may be due to the Utilities design emphasizing current robot positioning relative to the user rather than displaying cues that help users predict the robot's future destinations, unlike the other designs. Participant responses support this conclusion, revealing similarities between baseline and Utilities participants. Another possible reason for the poorer performance of the Utilities design could be the small scale of the task. In the experimental scenario, there was only a single robot. This allowed participants to simply always face or listen for the robot while working at the stations and navigating the environment. If the space was shared by more than a single robot, it is unlikely that participants would be able to track all robots simultaneously with only sight and sound. Utilities design might scale well in this case, providing unobtrusive support for tracking all proximal robots potentially even better than some of the other designs. However, for the single robot in this experiment, Navpoints, Arrow, and Gaze all performed significantly better than the baseline in terms of decreasing inefficiencies. Participants often noted that explicit visualizations of robot movements made the task easier.

Exemplary Computer System Overview

Aspects and implementations of the monitoring platform of the disclosure have been described in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware.

Figure 12:
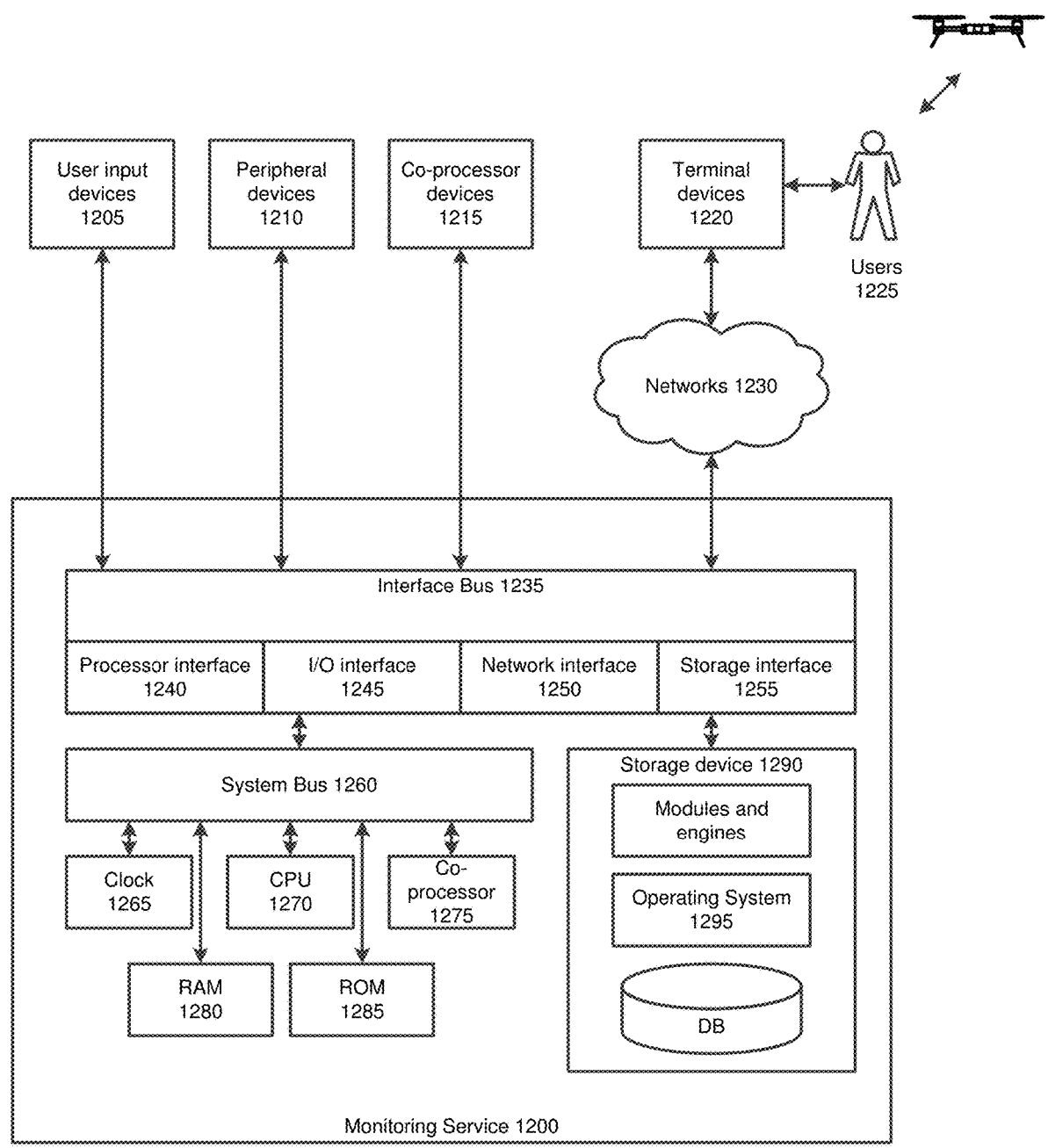
FIG. 12 is a block diagram illustrating an example machine representing the computer systemization of the monitoring platform that may be used in various embodiments of the present technology.

FIG. 12 is a block diagram illustrating an example machine representing the computer systemization of the monitoring system. The system controller 1200 may be in communication with entities including one or more users 1225 client/terminal devices 1220, user input devices 1205, peripheral devices 1210, an optional co-processor device(s) (e.g., cryptographic processor devices) 1215, and networks 1230. Users may engage with the controller 1200 via terminal devices 1220 over networks 1230.

Computers may employ central processing unit (CPU) or processor to process information. Processors may include programmable general-purpose or special-purpose microprocessors, programmable controllers, application-specific integrated circuits (ASICs), programmable logic devices (PLDs), embedded components, combination of such devices and the like. Processors execute program components in response to user and/or system-generated requests. One or more of these components may be implemented in software, hardware or both hardware and software. Processors pass instructions (e.g., operational and data instructions) to enable various operations.

The controller 1200 may include clock 1265, CPU 1270, memory such as read only memory (ROM) 1285 and random access memory (RAM) 1280 and co-processor 1275 among others. These controller components may be connected to a system bus 1260, and through the system bus 1260 to an interface bus 1235. Further, user input devices 1205, peripheral devices 1210, co-processor devices 1215, and the like, may be connected through the interface bus 1235 to the system bus 1260. The interface bus 1235 may be connected to a number of interface adapters such as processor interface 1240, input output interfaces (I/O) 1245, network interfaces 1250, storage interfaces 1255, and the like.

Processor interface 1240 may facilitate communication between co-processor devices 1215 and co-processor 1275. In one implementation, processor interface 1240 may expedite encryption and decryption of requests or data. Input output interfaces (I/O) 1245 facilitate communication between user input devices 1205, peripheral devices 1210, co-processor devices 1215, and/or the like and components of the controller 1200 using protocols such as those for handling audio, data, video interface, wireless transceivers, or the like (e.g., Bluetooth, IEEE 1394a-b, serial, universal serial bus (USB), Digital Visual Interface (DVI), 802.11a/b/g/n/x, cellular, etc.). Network interfaces 1250 may be in communication with the network 1230. Through the network 1230, the controller 1200 may be accessible to remote terminal devices 1220. Network interfaces 1250 may use various wired and wireless connection protocols such as, direct connect, Ethernet, wireless connection such as IEEE 802.11a-x, and the like.

Examples of network 1230 include the Internet, Local Area Network (LAN), Metropolitan Area Network (MAN), a Wide Area Network (WAN), wireless network (e.g., using Wireless Application Protocol WAP), a secured custom connection, and the like. The network interfaces 1250 can include a firewall which can, in some aspects, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, next-generation firewall, personal firewall, etc., without deviating from the novel art of this disclosure.

Storage interfaces 1255 may be in communication with a number of storage devices such as, storage devices 1290, removable disc devices, and the like. The storage interfaces 1255 may use various connection protocols such as Serial Advanced Technology Attachment (SATA), IEEE 1394, Ethernet, Universal Serial Bus (USB), and the like.

User input devices 1205 and peripheral devices 1210 may be connected to I/O interface 1245 and potentially other interfaces, buses and/or components. User input devices 1205 may include card readers, finger print readers, joysticks, keyboards, microphones, mouse, remote controls, retina readers, touch screens, sensors, and/or the like. Peripheral devices 1210 may include antenna, audio devices (e.g., microphone, speakers, etc.), cameras, external processors, communication devices, radio frequency identifiers (RFIDs), scanners, printers, storage devices, transceivers, and/or the like. Co-processor devices 1215 may be connected to the controller 1200 through interface bus 1235, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. The controller 1200 may employ various forms of memory including on-chip CPU memory (e.g., registers), RAM 1280, ROM 1285, and storage devices 1290. Storage devices 1290 may employ any number of tangible, non-transitory storage devices or systems such as fixed or removable magnetic disk drive, an optical drive, solid state memory devices and other processor-readable storage media. Computer-executable instructions stored in the memory may include the monitoring service 150 having one or more program modules such as routines, programs, objects, components, data structures, and so on that perform particular tasks or implement particular abstract data types. For example, the memory may contain operating system (OS) component 1295, modules and other components, database tables, and the like. These modules/components may be stored and accessed from the storage devices, including from external storage devices accessible through an interface bus.

The database components can store programs executed by the processor to process the stored data. The database components may be implemented in the form of a database that is relational, scalable and secure. Examples of such database include DB2, MySQL, Oracle, Sybase, and the like. Alternatively, the database may be implemented using various standard data-structures, such as an array, hash, list, stack, structured text file (e.g., XML), table, and/or the like. Such data-structures may be stored in memory and/or in structured files.

The controller 1200 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of the controller 1200 may be distributed electronically over the Internet or over other networks (including wireless networks). Those skilled in the relevant art(s) will recognize that portions of the monitoring service may reside on a server computer, while corresponding portions reside on a client computer. Data structures and transmission of data particular to aspects of the controller 1200 are also encompassed within the scope of the disclosure.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method for operating a head-mounted display, the method comprising:
   generating an augmented reality visualization of an environment of a user based on:
      data collected by a robot collocated with the user wearing a head-mounted display, wherein the data collected from the robot comprises information about a local environment or objects within a past or current environment of the robot; and
      a user perspective of the local environment when the user is wearing the head-mounted display; and
   displaying the augmented reality visualization of the local environment to the user via an augmented reality or mixed reality view in the head-mounted display.

2. The method of claim 1, further comprising:
   linking the user perspective of the local environment to the data collected by the robot; and
   generating the augmented reality visualization of the local environment based on the data linked to the user perspective.

3. The method of claim 2, wherein the information about the local environment or objects within the past or current environment of the robot comprises one or more of a temperature of the local environment, noise levels in the local environment, radiation levels of the local environment, air quality of the local environment, or chemical composition of the local environment.

4. The method of claim 1, further comprising:
   receiving one or more commands from the user instructing the robot to change robot states;
   updating the augmented reality visualization in the head-mounted display to show a result of the one or more commands; and
   transmitting the one or more commands to the robot to be executed.

5. The method of claim 1, wherein generating the augmented reality visualization of the environment of the user comprises:
   virtually augmenting the local environment with augmented reality to alter an appearance of the robot or add virtually imagery to local environment of the robot.

6. The method of claim 5, wherein the robot or the local environment of the robot is virtually augmented to communicate a response of the robot to teleoperation commands and facilitate teleoperation of the robot via a user interface.

7. The method of claim 1, wherein generating the augmented reality visualization of the environment of the user comprises:
   receiving one or more commands from the user instructing the robot to change robot states;
   analyzing the one or more commands to identify a hazard that would potentially lead to damage to the robot or the local environment or violate a rule of operation upon execution;
   generating a set of one or more modified commands to avoid the hazard;
   updating the augmented reality visualization in the head-mounted display to show a result of executing the one or more modified commands by the robot; and
   transmit the set of one or more modified commands to the robot to be executed.

8. The method of claim 7, wherein generating the set of one or more modified commands to avoid the hazard comprises:
   determining an intent of the user based on the one or more commands; and
   generating the set of one or more modified commands to preserve the intent of the user while avoiding the hazard.

9. The method of claim 7, wherein the head-mounted display comprises a user interface for teleoperating the robot, and the user interface comprises virtual augmentation comprising one or more of the following:
   a real-time virtual surrogate of the robot, such that virtual teleoperation of a real-time virtual surrogate directs teleoperation of the robot;
   a waypoint virtual surrogate of the robot, such that manipulation of virtual waypoints using the waypoint virtual surrogate directs teleoperation of the robot; or
   one or more non-virtual scene objects of an environmental context in which the robot is acting.

10. The method of claim 1, wherein the augmented reality visualization comprises a user interface that is virtually augmented to communicate robot motion intent.

11. The method of claim 1, wherein the augmented reality visualization in the head-mounted display communicates robot motion intent by at least one of the following:
   a NavPoints approach;
   an Arrows approach;
   a Gaze approach; or
   a Utilities approach.

12. The method of claim 1, further comprising tracking where the robot has traveled and wherein generating the augmented reality visualization of the environment of the user comprises:
   displaying robot data that identifies where the robot has traveled within the augmented reality visualization of the environment.

13. The method of claim 1, further comprising generating a datadrop at a location, wherein the datadrop comprises the data collected by a robot.

14. The method of claim 13, wherein the datadrop is automatically created in response to the robot detecting an event.

15. The method of claim 14, wherein the event includes one or more sensor parameter crossing a threshold.

16. The method of claim 13, wherein the datadrop is created in the location in response to a datadrop command from the user.

17. The method of claim 13, wherein additional robots passing by the location identify the datadrop and any augmented reality or mixed reality view is updated to visualize the data stored within the datadrop.

18. The method of claim 1, further comprising updating the augmented reality or mixed reality view to include relative position guidelines.

19. The method of claim 1, wherein the head-mounted display comprises an augmented reality display or a mixed reality display.

20. The method of claim 1, further comprising:
identifying a position of the robot within the local environment; and
modifying the augmented reality or mixed view in the head-mounted display to include a radar-like design to assist the user in teleoperation of the robot.

21. The method of claim 20, wherein the robot comprises one of:
a ground-based robot and the position of the robot is on the ground; or
is a flight-capable robot and the position of the robot is in the sky.

22. The method of claim 1, wherein the data collected from the robot comprises a robot intent or commands issued from the user.

23. A system comprising:
a non-virtual robot comprising sensors or cameras, wherein:
the non-virtual robot collects, using the sensors or the cameras, data as the non-virtual robot navigates an environment; and
the data collected by the non-virtual robot comprises information about a local environment or objects within a past or current environment of the non-virtual robot;
an augmented reality system comprising an augmented reality display, a communications module, a processor, a non-transitory computer readable medium having stored thereon instructions that when executed by the processor cause the augmented reality system to:
generate an augmented reality visualization of the local environment based on a subset of data collected by the non-virtual robot and a user perspective of the local environment when the user is wearing the augmented reality display; and
display the augmented reality visualization of the local environment to the user via the augmented reality display.

24. The system of claim 23, further comprising a cloud-based platform to store the information about the environment of the non-virtual robot.

25. The system of claim 23, wherein:
the augmented reality display is associated with one or more sensors to monitor for commands from the user to remotely operate the non-virtual robot; and
the communications module transmits the commands detected by the one or more sensors associated with the augmented reality display and transfers information about one or more robot states of the non-virtual robot to allow the augmented reality visualization to be updated.

26. The system of claim 23, wherein the augmented reality system comprises one or more interfaces for receiving commands to change a state of the non-virtual robot.

27. The system of claim 26, wherein the augmented reality system comprises a hazard detection module, under control of the processor, to:
receive one or more commands to change a state of the non-virtual robot;
analyze the one or more commands to identify a hazard that would potentially damage the non-virtual robot, damage an environment of the non-virtual robot, injure a collocated human, or violate an operational rule upon execution; and
generate a set of one or more modified commands to avoid the hazard or violation of the operational rule.

28. The system of claim 27, wherein the augmented reality system:
update the augmented reality visualization on the augmented reality display to show a result from executing the one or more modified commands by the non-virtual robot; and
transmit, using the communications module, the set of one or more modified commands to the robot to be executed; and
generate imagery via the augmented reality display of a robot state associated with the set of one or more modified commands to provide the user additional insights about the non-virtual robot and a current state of the non-virtual robot.

29. The system of claim 26, wherein the augmented reality system comprises an intention analyzer configured to:
determine, upon identifying a hazard that would potentially damage the non-virtual robot, damage to an environment of the non-virtual robot, injure a collocated human, or violate an operational rule upon execution, an intent of the user by analyzing the commands; and
generate a set of one or more modified commands to preserve the intent of the user.

30. The system of claim 23, wherein the augmented reality display comprises a head-mounted display.

31. The system of claim 23, wherein the non-virtual robot is virtually augmented to facilitate teleoperation of the non-virtual robot using a Callout design.

32. The system of claim 31, wherein:
the augmented reality display comprises a representation of one or more non-virtual scene objects in an environmental context in which the non-virtual robot is acting; and
the one or more non-virtual scene objects are virtually augmented to communicate robot motion intent.

33. The system of claim 31, wherein the augmented reality display comprises a representation of virtual imagery added to a representation of the local environment without augmentation of a non-virtual object.

34. The system of claim 31, wherein:
the augmented reality display comprises a representation of one or more non-virtual scene objects in an environmental context in which the non-virtual robot is actin; and
the representation is virtually augmented to facilitate teleoperation of the non-virtual robot via a user interface or via a Frustum design.

35. The system of claim 31, wherein:
the sensors of the non-virtual robot comprise non-real-time feedback sensors; and
the augmented reality display comprises a Frustrum design for providing feedback from the non-real-time feedback sensors.

36. The system of claim 35, wherein the non-real-time feedback sensors comprise at least one of x-ray or lidar.

37. The system of claim 23, wherein the augmented reality system communicates robot motion intent of the non-virtual robot by at least one of the following:
- a NavPoints approach;
- an Arrows approach;
- a Gaze approach; or
- a Utilities approach.

38. A method teleoperating a non-virtual robot the method comprising:
- receiving, via an augmented reality system, one or more commands that are likely to cause the non-virtual robot to perform an execution hazard or a rule violation, wherein the execution hazard is predicted to damage the robot, an environment of the non-virtual robot, or a collocated human or result in an operational rule violation;
- modifying the one or more commands to avoid the execution hazard or the rule violation; and
- generating an augmented reality visualization in the augmented reality system to show a surrogate robot emulating an expected response of the non-virtual robot to the one or more commands as modified to avoid the execution hazard or the rule violation.

39. The method of claim 38, wherein the rule violation would cause the non-virtual robot to exceed a maximum height, go below a minimum height, exceed a maximum speed, or fall below a minimum speed.

40. The method of claim 38, further comprising broadcasting to additional augmented reality systems a future state of the non-virtual robot.

* * * * *

UNITED STATES PATENT AND TRADEMARK OFFICE
CERTIFICATE OF CORRECTION

| | | |
|---|---|---|
| PATENT NO. | : 12,427,664 B2 | Page 1 of 1 |
| APPLICATION NO. | : 18/668453 | |
| DATED | : September 30, 2025 | |
| INVENTOR(S) | : Daniel Szafir et al. | |

It is certified that error appears in the above-identified patent and that said Letters Patent is hereby corrected as shown below:

On the Title Page

Item (71), Applicant, delete "The Regents of the University of Colorado" and insert --The Regents of the University of Colorado, a body corporate--

Item (73), Assignee, delete "The Regents of the University of Colorado" and insert --The Regents of the University of Colorado, a body corporate--

Signed and Sealed this
Second Day of December, 2025

John A. Squires
*Director of the United States Patent and Trademark Office*